(12) United States Patent
Stojanovski et al.

(10) Patent No.: US 11,812,497 B2
(45) Date of Patent: Nov. 7, 2023

(54) TECHNOLOGY COORDINATION FOR DEVICE-TO-DEVICE DISCOVERY

(71) Applicant: Apple Inc., Cupertino, CA (US)

(72) Inventors: Alexandre Saso Stojanovski, Paris (FR); Emily H. Qi, Gig Harbor, WA (US); Ana Lucia Pinheiro, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 316 days.

(21) Appl. No.: 16/474,036

(22) PCT Filed: Mar. 9, 2018

(86) PCT No.: PCT/US2018/021745
§ 371 (c)(1),
(2) Date: Jun. 26, 2019

(87) PCT Pub. No.: WO2018/165548
PCT Pub. Date: Sep. 13, 2018

(65) Prior Publication Data
US 2019/0394631 A1 Dec. 26, 2019

Related U.S. Application Data

(60) Provisional application No. 62/470,079, filed on Mar. 10, 2017.

(51) Int. Cl.
*H04W 8/00* (2009.01)
*H04W 92/18* (2009.01)
*H04W 4/80* (2018.01)

(52) U.S. Cl.
CPC ............ *H04W 8/005* (2013.01); *H04W 4/80* (2018.02); *H04W 92/18* (2013.01)

(58) Field of Classification Search
CPC ........ H04W 8/005; H04W 4/80; H04W 92/18
See application file for complete search history.

(56) References Cited

U.S. PATENT DOCUMENTS

| 2014/0273850 A1* | 9/2014 | Park | H04W 76/14 |
| | | | 455/41.2 |
| 2015/0049684 A1* | 2/2015 | Kim | H04W 72/23 |
| | | | 370/329 |

(Continued)

FOREIGN PATENT DOCUMENTS

| WO | WO-2016079309 A1 | 5/2016 |
| WO | WO-2016186414 A1 | 11/2016 |
| WO | 2019/095128 A1 | 5/2019 |

OTHER PUBLICATIONS

"International Application Serial No. PCT/US2018/021745, International Search Report dated Jun. 22, 2018", 3 pgs.

(Continued)

*Primary Examiner* — Gennadiy Tsvey
(74) *Attorney, Agent, or Firm* — Kowert, Hood, Munyon, Rankin & Goetzel, P.C.

(57) ABSTRACT

Embodiments of a ProSe Direct Discovery process are described. In some embodiments, an apparatus of a user equipment (UE) is configured as a Proximity Services (ProSe) enabled UE, and may encode, for transmission over a PC3 interface to a ProSe Function in a Home Public Land Mobile Network (HPLMN), a discovery request message for an announcing procedure, including transmission of one or more announcements over a PC5 interface, wherein the discovery request message for the announcing procedure includes a PC5 technology (PC5_tech) parameter to indicate a PC5 radio technology to be used by the UE for the announcing procedure. In some embodiments, the UE may decode a discovery response message for the announcing procedure, received over the PC3 interface from the ProSe (Continued)

Function in the HPLMN, including a ProSe application code and the PC5_tech parameter to indicate the PC5 radio technology authorized to be used for the ProSe application code.

20 Claims, 10 Drawing Sheets

(56) References Cited

U.S. PATENT DOCUMENTS

| | | | | |
|---|---|---|---|---|
| 2015/0215990 | A1* | 7/2015 | Lee | H04W 88/06 455/434 |
| 2015/0282108 | A1* | 10/2015 | Kiss | H04L 65/1104 455/435.1 |
| 2015/0327157 | A1* | 11/2015 | Al-Shalash | H04W 48/16 370/328 |
| 2017/0079081 | A1* | 3/2017 | Kim | H04W 4/80 |
| 2017/0230793 | A1* | 8/2017 | Sugiyama | H04W 4/80 |
| 2017/0337394 | A1* | 11/2017 | Wang | H04L 67/51 |
| 2018/0063691 | A1* | 3/2018 | Shuman | H04W 24/02 |
| 2018/0279110 | A1* | 9/2018 | Sen | H04W 8/005 |
| 2018/0279394 | A1* | 9/2018 | Peng | H04L 29/06 |
| 2018/0295655 | A1* | 10/2018 | Cavalcanti | H04W 76/10 |
| 2019/0261132 | A1* | 8/2019 | Catalano | H04W 4/023 |

OTHER PUBLICATIONS

"International Application Serial No. PCT/US2018/021745, Written Opinion dated Jun. 22, 2018", 6 pgs.

Intel, et al., "Inclusion of WLAN direct discovery technologies as an alternative for ProSe Direct Discovery: WLAN technology agnostic part", S2-170816, 3GPP TSG SA WG2 Meeting #119, Dubrovnik, Croatia, (Feb. 7, 2017).

Intel, et al., "Inclusion of WLAN direct discovery technologies as an alternative for ProSe Direct Discovery: WLAN technology agnostic part", S2-170817, 3GPP TSG SA WG2 Meeting #119, Dubrovnik, Croatia, (Feb. 7, 2017).

Intel Corporation, "Discussion on inclusion of WLAN direct discovery technologies as an alternative for ProSe direct discovery", S1-163076, 3GPP TSG SA WG1 Meeting #76, Santa Cruz, Spain, (Oct. 27, 2016).

"3rd Generation Partnership Project; Technical Specification Group Services and System Aspects; Proximity-Based Services (ProSe); Stage 2", Release 14, 3GPP, TS 23.303, vol. SA WG2, No. V14.1.0, Dec. 16, 2016, pp. 1-125.

Intel Corporation et al, "Inclusion of WLAN Direct Discovery Technologies as an Alternative for ProSe Direct Discovery", 3GPP Draft, S1-163241 (was S1-163202 and S1-163081); vol. SA WG1, Nov. 10, 2016, Santa Cruz, Spain, 5 pgs.

European Search Report for Application No. EP18763993.5, dated Dec. 14, 2020, 9 pgs.

* cited by examiner

TECHNOLOGY COORDINATION FOR DEVICE-TO-DEVICE DISCOVERY

PRIORITY CLAIM

This application is a U.S. National Stage Filing under 35 U.S.C. 371 from International Application No. PCT/US2018/021745, filed Mar. 9, 2018 and published in English as WO 2018/165548 on Sep. 13, 2018, which claims priority to U.S. Provisional Patent Application Ser. No. 62/470,079 filed, Mar. 10, 2017, each of which is incorporated herein by reference in its entirety.

TECHNICAL FIELD

Embodiments pertain to wireless networks and wireless communications. Some embodiments relate to 3GPP Long Term Evolution (LTE) networks including LTE-Advanced (LTE-A) networks. Some embodiments relate to 5G networks. Some embodiments relate to networks using unlicensed spectrum, such as Wireless Local Area Networks (WLAN). Some embodiments relate to methods, computer readable media, and apparatuses for Proximity Services (ProSe) Direct transmissions.

BACKGROUND

Wireless communication systems, including Long Term Evolution (LTE) and LTE-Advanced (LTE-A) standards developed by the 3rd Generation Partnership Project (3GPP), have incorporated device-to-device (D2D) communication technologies as a way for user equipment (UE) to receive and transmit data to one another using direct cellular links. Such technologies may be useful in cases where mobile devices demand high data throughput, posing challenges for networks an accommodating such demands.

In many instances pairs or groups of mobile devices communicating with each other over a network may be located within a certain proximity of each other. It may be beneficial to the network, and to devices operating in the network, for direct device-to-device (D2D) communications to be established between some of the mobile devices. Accordingly, D2D communications may alleviate device loading or demands of the network.

Standards developed by the 3GPP have included a framework for Proximity Services (ProSe), including a definition of a cellular-based or Evolved Universal Terrestrial Radio Access (E-UTRA) based D2D interface referred to as PC5 or PC5 interface. ProSe services may be provided when UEs are within a certain proximity of each other and may comprise ProSe Direct Discovery using LTE and/or LTE-A resources.

DETAILED DESCRIPTION

Figure 1:
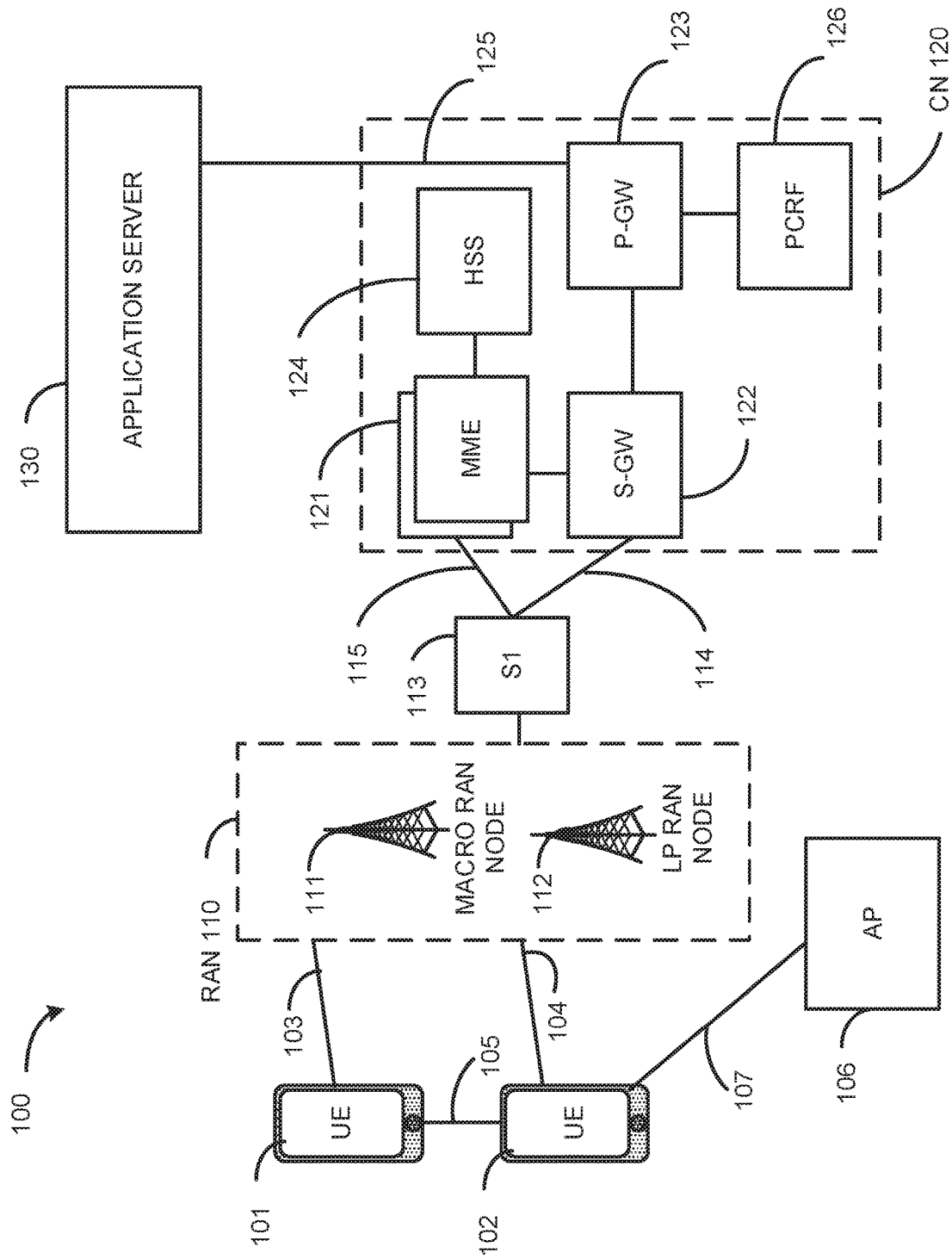
FIG. 1 illustrates an exemplary system architecture of a wireless network in accordance with some embodiments.

FIG. 1 illustrates an architecture of a system 100 of a network in accordance with some embodiments. In some embodiments, the system 100 may be configured for ProSe operations, for example, transmission of ProSe related messages for initiating and authorizing ProSe Direct Discovery and ProSe Direct Communication. In some embodiments, two or more user equipment (UE) that are within a certain proximity of each other may be configured to communicate in a Device-to-Device (D2D) configuration, by ProSe Direct Discovery and ProSe Direct Communication.

The system 100 is shown to include a user equipment (UE) 101 and a UE 102, for example a UE configured for ProSe Direct Discovery and/or ProSe Direct Communication. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices ((within the Internet infrastructure), with short-lived connections. The IoT UEs may execute background applications (e.g., keep-alive messages, status updates, etc. to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDCCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs), An ECCE may have other numbers of EREGs in some situations.

The RAN 110 is shown to be communicatively coupled to a core network (GN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124.

The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 26 to indicate a new smice flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2A:
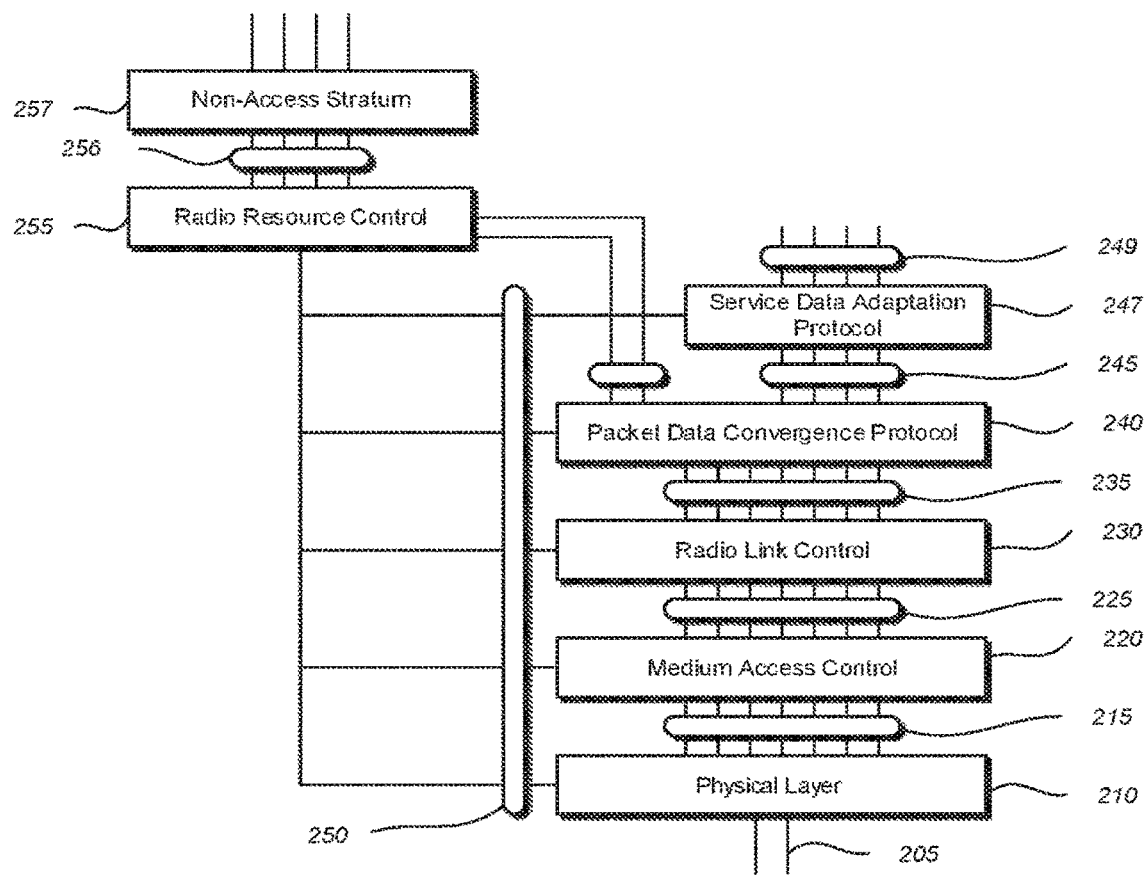
FIG. 2A illustrates protocol functions that may be implemented in a wireless communication device in accordance with some embodiments.

FIG. 2A illustrates protocol functions that may be implemented in a wireless communication device in accordance with some embodiments.

In some embodiments, protocol layers may include one or more of physical layer (PHY) 210, medium access control layer (MAC) 220, radio link control layer (RLC) 230, packet data convergence protocol layer (PDCP) 240, service data adaptation protocol (SDAP) layer 247, radio resource control layer (RRC) 255, and non-access stratum (NAS) layer 257, in addition to other higher layer functions not illustrated.

According to some embodiments, protocol layers may include one or more service access points that may provide communication between two or more protocol layers.

According to some embodiments, PHY 210 may transmit and receive physical layer signals 205 that may be received or transmitted respectively by one or more other communication devices (e.g., UE 101, UE 102, device 300). According to some aspects, physical layer signals 205 may comprise one or more physical channels.

According to some embodiments, an instance of PHY 210 may process requests from and provide indications to an instance of MAC 220 via one or more physical layer service access points (PHY-SAP) 215. According to some embodiments, requests and indications communicated via PHY-SAP 215 may comprise one or more transport channels.

According to some embodiments, an instance of MAC 210 may process requests from and provide indications to an instance of RLC 230 via one or more medium access control service access points (MAC-SAP) 225. According to some embodiments, requests and indications communicated via MAC-SAP 225 may comprise one or more logical channels.

According to some embodiments, an instance of RLC 230 may process requests from and provide indications to an instance of PDCP 240 via one or more radio link control service access points (RLC-SAP) 235. According to some embodiments, requests and indications communicated via RLC-SAP 235 may comprise one or more RLC channels.

According to some embodiments, an instance of PDCP 240 may process requests from and provide indications to one or more of an instance of RRC 255 and one or more instances of SDAP 247 via one or more packet data convergence protocol service access points (PDCP-SAP) 245. According to some embodiments, requests and indications communicated via PDCP-SAP 245 may comprise one or more radio bearers.

According to some embodiments, an instance of SDAP 247 may process requests from and provide indications to one or more higher layer protocol entities via one or more service data adaptation protocol service access points (SDAP-SAP) 249. According to some embodiments, requests and indications communicated via SDAP-SAP 249 may comprise one or more quality of service (QoS) flows.

According to some embodiments, RRC entity 255 may configure, via one or more management service access points (M-SAP) 250, embodiments of one or more protocol layers, which may include one or more instances of PHY 210, MAC 220, RLC 230, PDCP 240 and SDAP 247. According to some embodiments, an instance of RRC may process requests from an provide indications to one or more non-access stratum (NAS) entities 257 via one or more RRC service access points (RRC-SAP) 256.

Figure 2B:
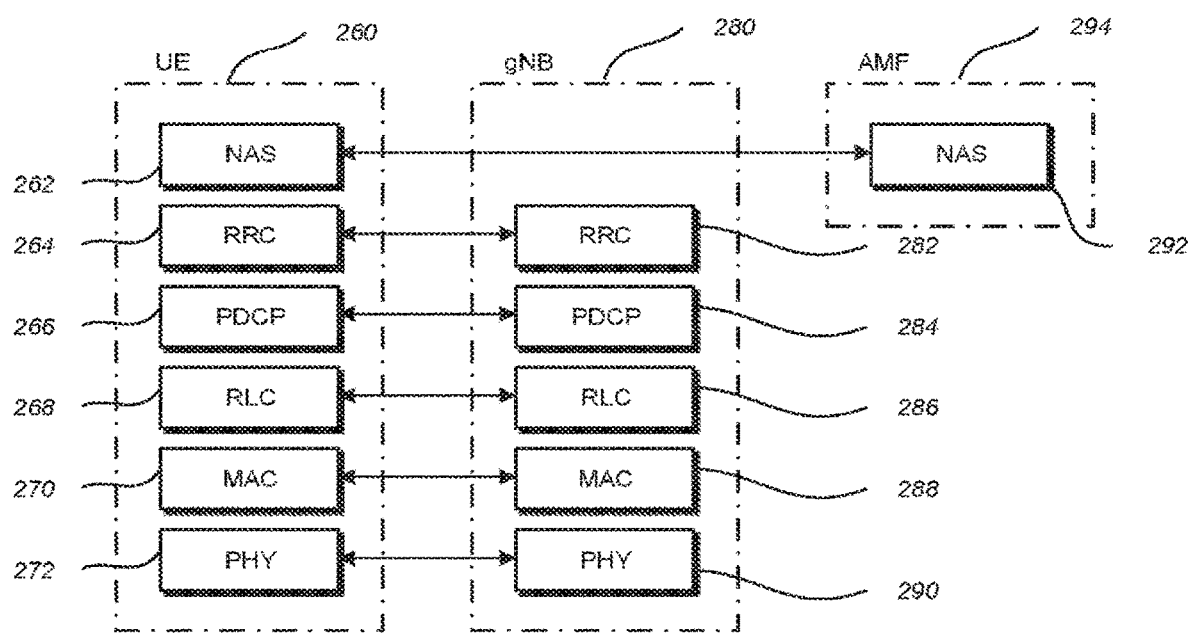
FIG. 2B illustrates protocol entities that may be implemented in wireless communication devices in accordance with some embodiments.

FIG. 2B illustrates protocol entities that may be implemented in wireless communication devices in accordance with some embodiments. For example, protocol entities that may be implemented in wireless communication devices including one or more of a UE 260 (e.g., UE 101, UE 102, device 300), a basestation, which may be termed an evolved node B (eNB), or new radio node B (gNB) 280, and a network function, which may be termed a mobility management entity (MME), or an access and mobility management function (AMF) 294, according to some embodiments.

According to some embodiments, 5GNB 280 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some embodiments, one or more protocol entities that may be implemented in one or more of UE 260 (e.g., UE 101, UE 102, device 300), gNB 280 and AMF 294, may be described as implementing all or part of a protocol stack in which the layers are considered to be ordered from lowest to highest in the order PHY, MAC, RLC, PDCP, RRC and NAS. According to some embodiments, one or more protocol entities that may be implemented in one or more of UE 260, gNB 280 and AMF 294, may communicate with a respective peer protocol entity that may be implemented on another device, using the services of respective lower layer protocol entities to perform such communication.

According to some embodiments, UE PHY 272 and peer entity gNB PHY 290 may communicate using signals transmitted and received via a wireless medium. According to some embodiments, UE MAC 270 and peer entity gNB MAC 288 may communicate using the services provided respectively by UE 272 and gNB PHY 290. According to some embodiments, UE RLC 268 and peer entity gNB RLC 286 may communicate using the services provided respectively by UE MAC 270 and gNB MAC 288. According to some embodiments, UE PDCP 266 and peer entity gNB PDCP 284 may communicate using the services provided respectively by UE RLC 268 and 5GNB RLC 286. According to some embodiments, UE RRC 264 and gNB RRC 282 may communicate using the services provided respectively by UE PDCP 266 and gNB PDCP 284. According to some embodiments, UE NAS 262 and AMF NAS 292 may communicate using the services provided respectively by UE RRC 264 and gNB RRC 282.

Figure 3:
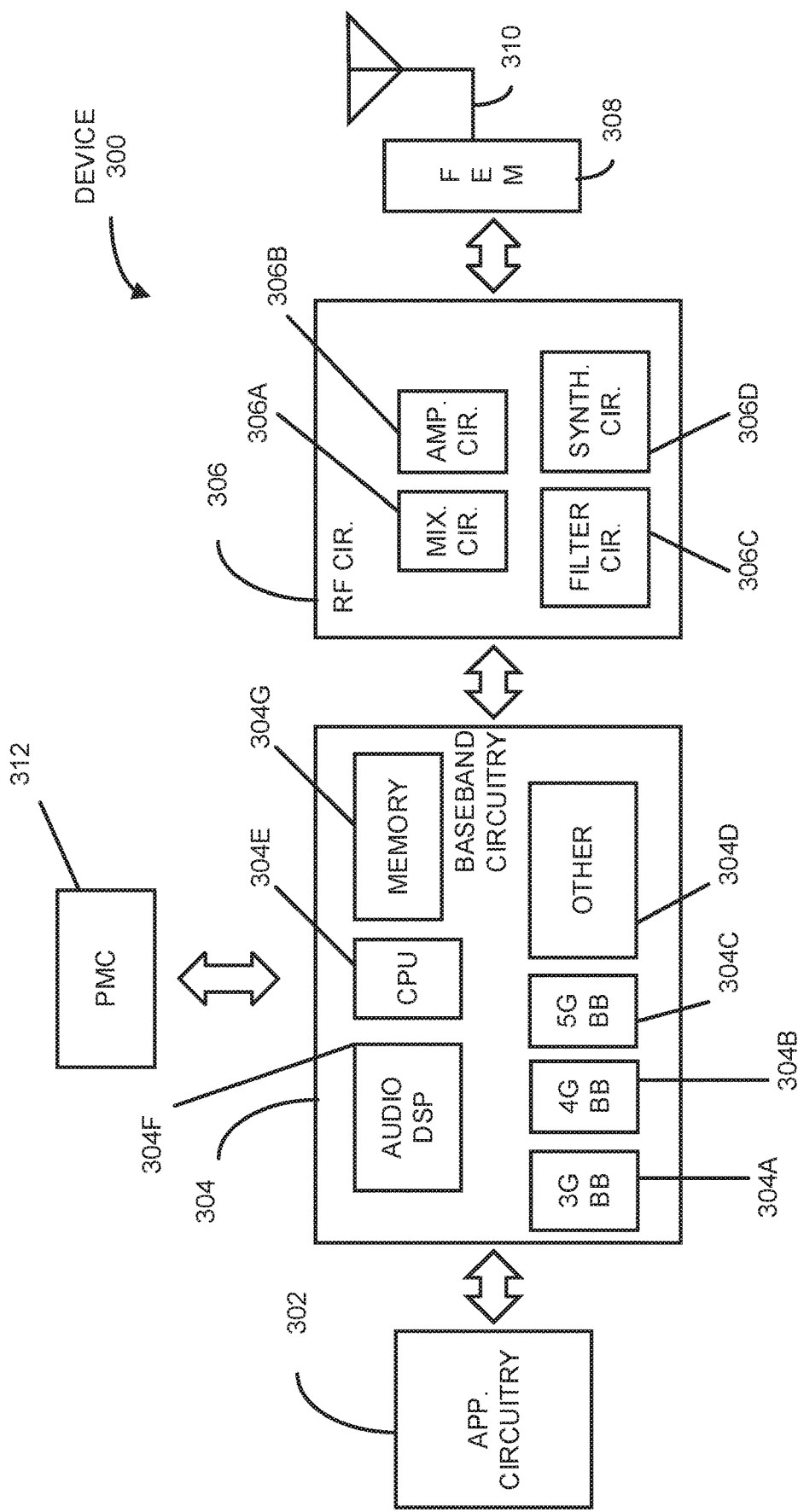
FIG. 3 illustrates example components of a device in accordance with some embodiments.

FIG. 3 illustrates example components of a device 300 in accordance with some embodiments. For example, the device 300 may be a UE configured for ProSe Direct Discovery and/or ProSe Direct Communication (e.g., UE 101, UE 102, UE 260).

In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE (e.g., UE 101, UE 102, UE 260) or a RAN node (e.g., Macro RAN node 111, LP RAN node 112, gNB 280). In some embodiments, the device 300 may include less elements (e.g., a RAN node may not utilize application circuitry 302, and instead may include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations)

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuity 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306.

In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), preceding, or constellation mapping/demapping, functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FEM circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RF circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RE signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in a UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC_Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack (e.g., protocol stack described with respect to FIGS. 2A and 2B). For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 255, 264, 282). As referred to herein, Layer 2 may comprise a MAC layer (e.g., 220, 270, 288), a RLC layer (e.g., 230, 268, 286), and a PDCP layer (e.g., 240, 266, 284), As referred to herein. Layer 1 may comprise a PHY layer (e.g., 210, 272, 290) of a UE/RAN node.

Figure 4:
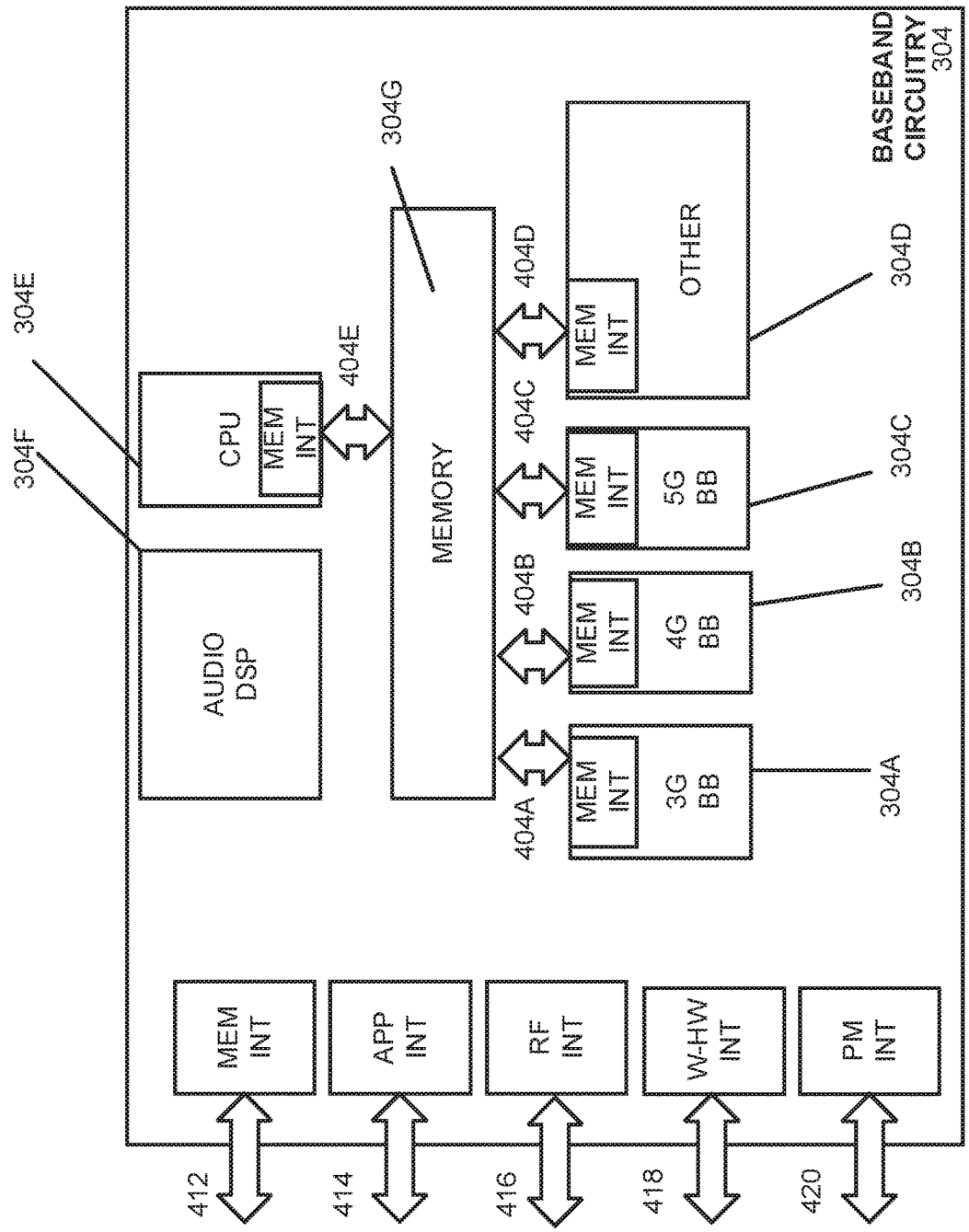
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NFC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
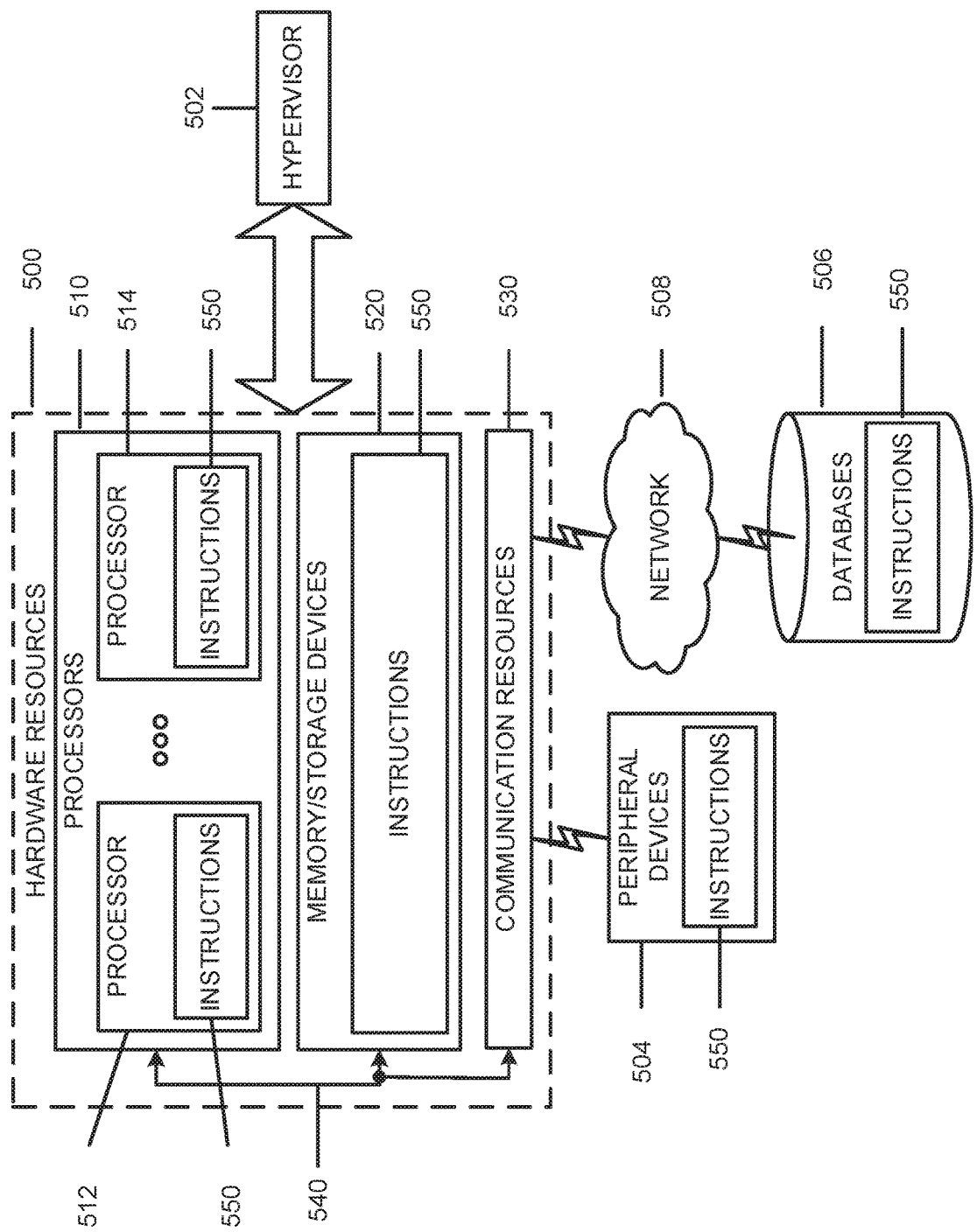
FIG. 5 is a block diagram illustrating components, according to some example embodiments, able to read instructions from a machine-readable or computer-readable medium.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein, for example, one or more ProSe Direct Discovery processes. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM, Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

In some instances, it may be advantageous for a UE (e.g., UE 101, UE 102, UE 260, device 300) that is within a certain proximity of another UE to use a particular Device-to-Device (D2D) technology as part of ProSe Direct Discovery and/or ProSe Direct Communication (e.g., over a PC5 interface). Such ProSe Direct Discovery and/or ProSe Direct Communication may include the use of one or more radio technologies, including a WLAN-based technology and/or a cellular-based technology. In some embodiments, WLAN-based technologies for direct discovery and direct communications between UEs (using the PC5 interface) may provide useful alternatives to cellular-based technologies for ProSe Direct Discovery.

WLAN-based technologies for direct discovery and direct communications between UEs may include, for example, Neighbor Awareness Networking (NAN) and Wi-Fi Peer-to-Peer (P2P), although embodiments are not so limited, as UEs may use alternative WLAN based technologies for ProSe Direct Discovery. Cellular-based technologies for direct discovery and direct communications between UEs may include, for example, E-UTRA-based and/or NextGen-based (e.g., NG RAN-based) technologies, although embodiments are not so limited, as UEs may use alternative cellular-based technologies for ProSe Direct Discovery Challenges may arise in coordinating two or more UEs that are configured for using both WLAN-based technologies for ProSe Direct Discovery and cellular-based technologies for ProSe Direct Discovery. For example, situations may occur where a UE that is announcing (e.g., advertising) for ProSe Direct Discovery may be using a WLAN-based technology and another UE that is monitoring (e.g., listening) for ProSe Direct Discovery may be using an E-UTRA-based technology (e.g., or NG RAN-based technology), or vice versa. It may be advantageous, in certain embodiments, for a solution to coordinate PC5 radio technologies, used for ProSe Direct Discovery in announcing and monitoring, among two or more UEs.

In some embodiments, additional parameters, for ProSe Direct Discovery operations, may be introduced to ProSe messages for transmission between two or more UEs, between a UE and a ProSe Function (e.g., network elements that are configured as ProSe Functions), and/or between two or more ProSe Functions. In certain embodiments, such parameters may be applicable for ProSe Direct Discovery operations using cellular-based radio technologies and/or WLAN-based radio technologies.

In certain embodiments, ProSe messages for ProSe Direct Discovery operations may be transmitted over interfaces defined by one or more standards, for example, one or more standards developed by the 3GPP. In some embodiments, such interfaces may include a PC3 interface, a PC6 interface, and/or a PC7 interface, and the contents of such messages may also correlate to a PC5 interface for ProSe Direct Discovery, PC3 (e.g., PC3 interface) may refer to a reference point between a UE and a ProSe Function (e.g., a network element configured as a ProSe Function), and may rely on EPC user plane for transport.

PC5 (e.g., PC5 interface) may refer to a reference point between one or more UEs (e.g., ProSe-enabled UEs) used for control and user plane operations related to ProSe Direct Discovery. Certain layers (e.g., lower layers) of the PC5 reference point may be based on E-UTRA (e.g., sidelink) capabilities and/or on one or more WLAN-based radio technologies.

PC6 (e.g., PC6 interface) may refer to a reference point between one or more ProSe Functions in different PLMNs (e.g., EPC-level ProSe Discovery) or between the ProSe Function in an HPLMN and the ProSe Function in a Local PLMN (LPLMN). With ProSe Direct Discovery, in sonic embodiments, the PC6 interface (e.g., reference point) may be used for transmission of messages related to ProSe Direct Discovery request/response, messages related to ProSe authorization and retrieval of discovery filters, and ProSe application code and/or ProSe application mask(s).

PC7 (e.g., PC7 interface) may refer to a reference point between a ProSe Function in an HPLMN and a ProSe Function in a VPLMN. With ProSe Direct Discovery, in some embodiments, the PC7 interface (e.g., reference point) may be used for transmission of messages related to ProSe Direct Discovery request/response, messages related to ProSe authorization and retrieval of discovery filters, and ProSe application code and/or ProSe application mask(s).

Figure 6:
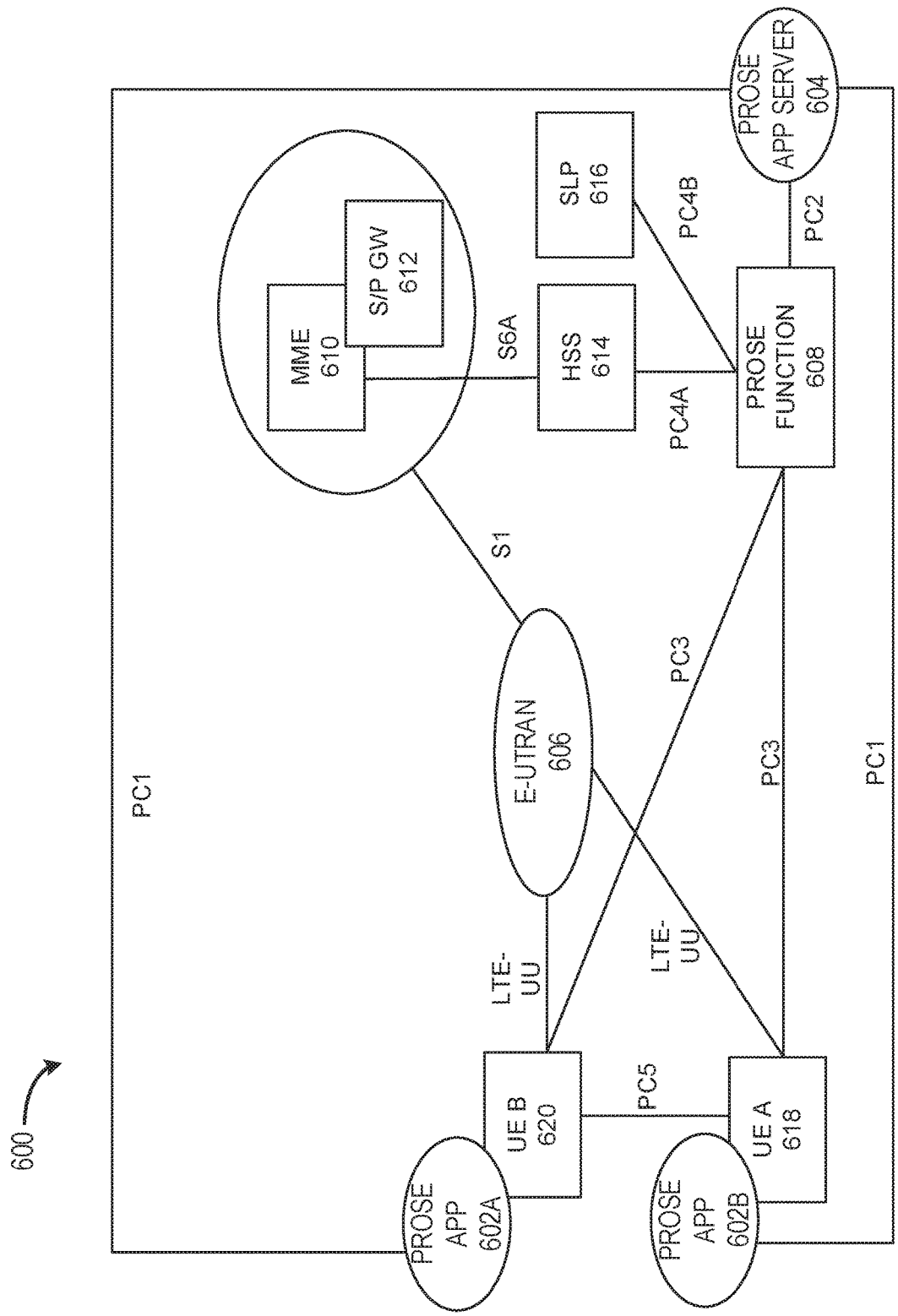
FIG. 6 is a block diagram illustrating an exemplary ProSe system architecture in accordance with some embodiments.

FIG. 6 is a block diagram illustrating an exemplary ProSe system architecture 600, according to some example embodiments. In some embodiments, the ProSe system architecture 600 may be included as part of the architecture of the system 100 of FIG. 1, or may be a separate system architecture. The ProSe system architecture 600 may be E-UTRA-based and may include the E-UTRAN 606, MME 610 (e.g., 121), a S-GW and P-GW 612 (e.g., 122, 123), HSS 614 (e.g., 124), a Secure User Plane Location Platform (SLP) 616, user equipment (UE) configured for ProSe operations 618, 620, one or more ProSe Application Servers 604, one or more ProSe Functions 608, and one or more ProSe Applications 602A and 602B. In other embodiments, the ProSe system architecture 600 may be a 5G system architecture or may be part of a 5G system architecture, and may include a NG RAN and other related network elements.

In some embodiments, UE A 618 and UE B 620 may be configured with a ProSe Application (e.g., 602A and 602B) and may be configured to communicate using a D2D technology as part of ProSe Direct Discovery and/or ProSe Direct Communication (e.g., over the PC5 interface/PC5 reference point).

In some embodiments, a ProSe function (e.g., 608) and a ProSe Application Server (e.g., 604) may be configured to communicate over the PC2 interface/reference point. The ProSe Function 608, in some embodiments, communicate with one or more UEs (e.g., UE A 618 and/or UE B 620) over the PC3 interface/reference point.

In some embodiments, a ProSe Application (e.g., ProSe Application 602A and/or ProSe Application 602B) may be configured to communicate with a ProSe Application Server (e.g., 604) over the PC1 interface/reference point, for example to define application level signaling requirements. The PC4A reference point is a communication link between the HSS 614 and ProSe Function 608, and the PC4B reference point is a communication link between the SLP 616 and the ProSe Function 608.

In certain embodiments, a UE (e.g., UE A 618 and/or UE B 620) may transmit control information over the PC5 interface to be relayed over the LTE-Uu interface (e.g., towards the ProSe Function). The S6A interface may be used to download ProSe related subscription information to MMF during E-UTRAN attach procedure or to inform MME subscription information in the HSS has changed.

Figure 7:
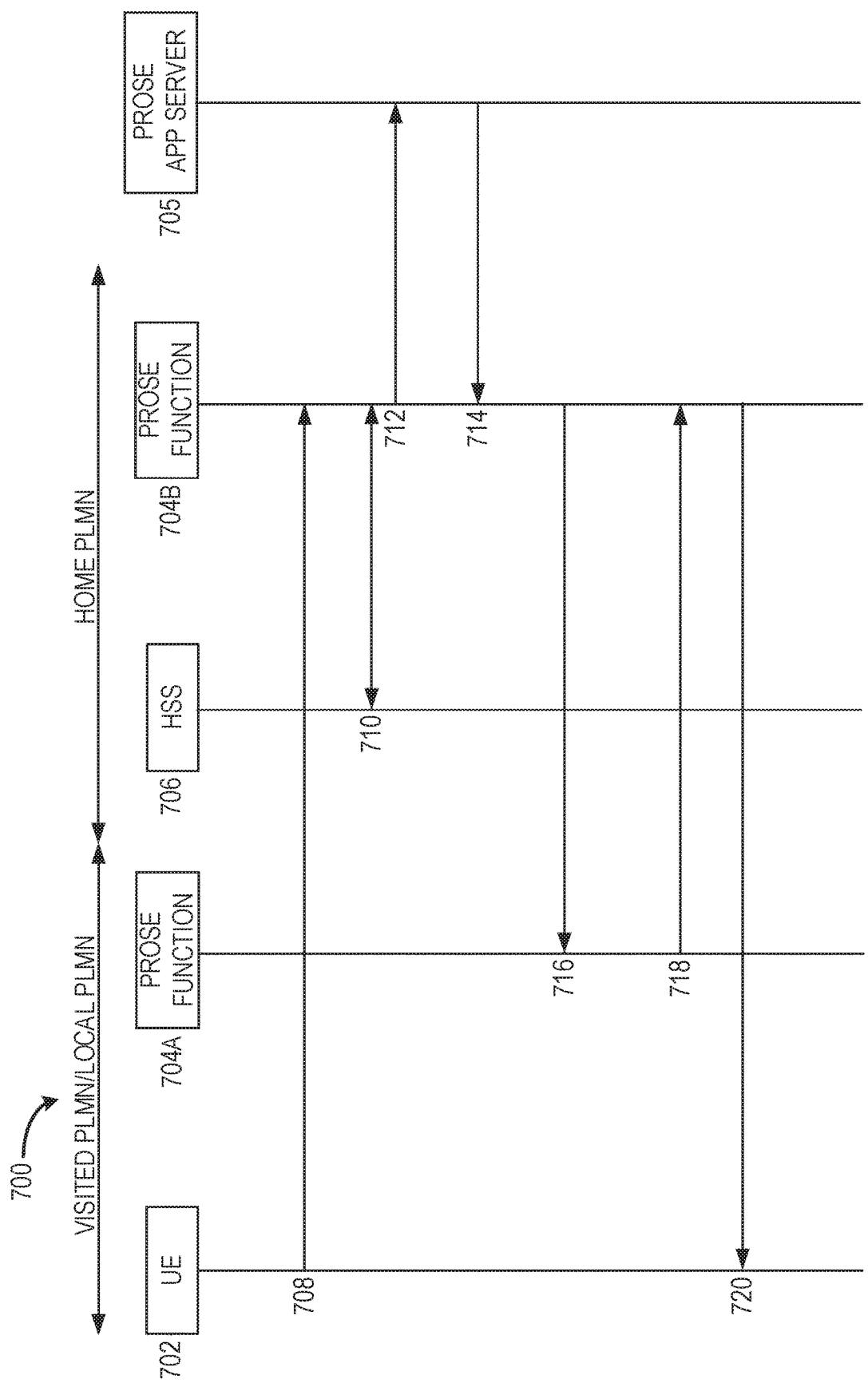
FIG. 7 illustrates an exemplary flow of an announce request procedure for direct discovery in accordance with some embodiments.

FIG. 7 illustrates an exemplary flow 700 of an announce request procedure for direct discovery, in accordance with some embodiments. ProSe services may be provided, for example, by the 3GPPP system architecture based on UEs being in proximity to each other. In some embodiments, a 3GPP system architecture may enable ProSe functions including EPC-level ProSe Discovery, EPC support for WLAN-based direct discovery and communication, Direct discovery and communication, and UE-to-Network relay.

In some embodiments, FIG. 7 illustrates a flow between a UE 702. (e.g., configured for announcing direct discovery messages) and one or more network elements of a 3GPP system architecture for ProSe Direct discovery. Network elements may include, in some embodiments, one or multiple ProSe Functions (e.g., 704A, 704B), one or multiple ProSe servers (e.g., 705) and a Home Subscriber Server (HSS) (e.g., 706). In some embodiments, a UE 702 maybe operating within a VPLMN and/or a LPLMN and may transmit a request message to announce (e.g., advertise) for direct discovery. For example, the UE 702 may transmit a discovery request message (e.g., Discovery Request) 708 to a ProSe Function 704B (e.g., network element configured as a ProSe Function) to establish direct discovery with another UE. In certain embodiments, the ProSe Function 704B is in the HPLMN.

In some embodiments, the discovery request message 708 may include parameters for establishing direct discovery with another UE, for example, any one or more of ProSe Application ID, UE Identity, announce command, Application ID, and/or Discovery Entry ID. The ProSe Application ID parameter may indicate that a UE (e.g., 702) is to announce (e.g., advertise ProSe Direct Discovery). The UE Identity parameter may identify a particular UE for ProSe Direct Discovery and may be set to, for example, an International Mobile Subscriber identity (IMSI). The announce command may indicate a type of discovery request (e.g., discovery request message). The Application ID may represent a unique identifier of a UE application that has triggered transmission of a discovery request message. The Discovery Entry ID may indicate whether a request (e.g., discovery request message) is a new request.

In some embodiments, the discovery request message 708 may also include one or more optional parameters, for example, any one or more of Requested Timer, Metadata, Announcing Public Land Mobile Network (PLMN) ID, Application Level Container, and/or a PC5 technology parameter (e.g., PC5_tech) to indicate a PC5 radio technology to be used by a UE for announcing and/or monitoring as part of a ProSe operation (e.g., ProSe Direct Discovery). The Requested Timer may indicate a length of a validity timer associated with ProSe Application Code (e.g., from the ProSe Function). For example, the validity timer may indicate a length of time the ProSe Application Code may be valid. In some instances, the optional parameter Metadata is included. If dynamic meta.data is used, the discovery request message 708 may also include the metadata to be uploaded to the ProSe Function. In some embodiments, when a UE updates the Metadata parameter for a valid ProSe application code (explained further below), a command in the discovery request message 708 may be set to "metadata_update."

The parameter Announcing PLMN ID may indicate a PLMN, for example, a VPLMN and/or a LPLMN, in which a UE 702 may be configured to announce for ProSe Direct Discovery. The parameter Application Level Container may include any relevant information for a ProSe application server to assign one or more ProSe application code suffixes. The parameter PC5_tech may indicate a PC5 radio technology that the UL 702 is to use for announcements (e.g., to use for advertising to another UE for ProSe Direct Discovery). PC5 radio technologies may include, for example, a cellular-based radio technology (e.g., E-UTRA-based, LTE, LTE-A, 5G, NextGen-based, NG RAN-based), and/or a WLAN-based radio technology (e.g., NAN, and Wi-Fi P2P). However, embodiments are not limited to PC5 radio technologies specified herein, and one or more other PC5 radio technologies may be used for ProSe Direct Discovery.

It will be appreciated that a UE may be configured to use multiple PCS radio technologies, and therefore the PCS tech parameter may indicate more than one PCS radio technology (e.g., corresponding to more than one ProSe application codes, respectively). PC5 tech is an optional parameter that indicates the PC5 radio technology (e.g. E-UTRA, NAN, Wi-Fi P2P) that UE wishes to use for monitoring. PC5 tech may include more than one PC5 radio technology. When this parameter is omitted the intended PCS radio technology is E-UTRA. In some embodiments, the PC5 tech parameter is encoded as a bitmap, each bit indicating support for a specific PC5 radio technology. In some embodiments, the PCS tech parameter may be omitted, in which case the PCS radio technology may be designated as a cellular-based (e.g., E-UTRA-based) technology. In certain embodiments, the UE 702 may transmit a request message (e.g., Discovery Request 708) to a ProSe Function in its HPLMN (e.g., 704B).

In some embodiments, if transmission of ProSe Direct Discovery related messages are to be sent between two or more PLMNs, such as in inter-PLMN ProSe discovery transmissions (e.g., ProSe Direct Discovery), and a carrier frequency signaled by a serving PLMN is not supported by a HPLMN or VPLMN, the UE 702 may include a PLMN ID of that carrier frequency in the Announcing PLMN ID. If application-controlled extension is used, in certain embodiments, the discovery request message 708 may also include the Application Level Container. In some embodiments, the ProSe Function may check for authorization (e.g., in 710) of an application represented by an Application ID (e.g., Application ID parameter in the discovery request message).

If there is no associated UE context, in some instances, the ProSe Function (e.g., 704B) may verify authorization for Direct Discovery (e.g., in a Discovery Authorization 710) with the HSS (e.g., 706) and may create a new context for the UE (e.g., 702) that contains the subscription parameters for the UE 702. The HSS 706 may provide a Mobile Station International Subscriber Directory Number (MSISDN) of the UE 702. The HSS 706, in some embodiments, may also provide a VPLMN ID of where the UE 702 is registered. In certain embodiments, when the parameter Discovery Entry ID in the discovery request message 708 does not contain a valid value for a UE (e.g., UE 702), the ProSe Function (e.g., 704B) may create a new discovery entry in the UE's context for this request, and may return the corresponding identifier in the discovery response message (described further below). In some embodiments, the Home ProSe Function (e.g., ProSe Function 704B in HPLMN) may retain the previously camped PLMN ID and associated ProSe application code for an operator configurable time when informed by HSS 706 of a PLMN change. When the configuration timer expires, in some instances, the previously camped PLMN ID and associated ProSe application code may be removed from the UE context.

In some embodiments, if the UE (e.g., 702) has indicated an application-controlled extension by the inclusion of the parameter Application Level Container (e.g., in the discovery request message), the ProSe Function 704B may send an authorization request message (e.g., Auth Request) 712. For example, the ProSe Function 704B may transmit authorization request message 712 to the ProSe Application Server 705. The authorization request message 712, in some embodiments, may include one or more parameters, for example, any one or more of ProSe Application ID, Request Type, Application Level Container, and/or Allowed number of suffixes. The Request Type, in some instances, may be set to "open discovery with application-controlled extension/announce," although embodiments are not so limited. The Allowed Number of Suffixes may indicate how many ProSe Restricted Code Suffixes the ProSe Application Server (e.g., 705) can assign for the UE (e.g., 702). The ProSe Function 704B may locate the ProSe Application Server 705 based on the Application ID.

In some embodiments, the ProSe Application Server 705 may return an authorization response message (e.g., Auth Response) 714. For example, the ProSe Application Server 705 may transmit authorization response message 714 to the ProSe Function 704B. The authorization response message 714, in some embodiments, may include one or more parameters, for example, any one or more of a Response Type and/or a ProSe Application Code Suffix pool. The ProSe Application Code Suffix pool may contain one or more suffixes allocated by the ProSe application based on the inputs associated with the authorization request message 714. The Response Type, in some instances, may be set to "open discovery with application-controlled extension/announce ack," although embodiments are not so limited.

In some embodiments, the ProSe Application Server 705 may choose a length of the ProSe Restricted Code Suffix from a set of allowable lengths (e.g., 8 bits, 24 bits, 48 bits). For example, the ProSe Application Server 705 may choose the length of the ProSe Restricted Code Suffix per application, so that all UEs announcing ProSe application codes assigned for ProSe Application IDs from that Application ID use the same suffix length. In some embodiments, the suffix length may be zero if no application controlled extension is allowed for an application. In some embodiments, the ProSe Application Code Suffix pool may be configured to support an indication of a large number of ProSe Application Code Suffixes and/or a range of ProSe Application Code Suffixes.

In some embodiments, if a discovery request message 708 is authorized (e.g., the ProSe Application Server 705 authorizes the Discovery Request 708 and transmits Auth Response 714 to the ProSe Function 704B), the ProSe Function 704B (e.g., HPLMN ProSe Function) may check whether the UE is authorized to use the ProSe Application ID contained in the discovery request message 708. If the UE is authorized to use the ProSe Application ID, in some embodiments, the ProSe Function 704B (e.g., HPLMN ProSe Function) may inform another ProSe Function, for example, the ProSe Function 704A in VPLMN or Local PLMN, with an announced authorization message 716 (e.g., Announce Auth), for example, if Announcing PLMN ID is included in the discovery request message 708. In some embodiments, the announce authorization message 716 may include one or more parameters, for example, any one or more of a ProSe Application ID, ProSe Application Code, UE Identity, validity timer, Discovery Entry ID, and/or Metadata. In some embodiments, the ProSe Application ID may correspond to a request from the UE 702 (e.g., discovery request message 708) and the ProSe Application Code may indicate the assigned code for the discovery request message 708.

In some embodiments, a discovery request message (e.g., discovery request message 708) may also include UE Identity information (e.g., IMSI or MSISDN) and a validity timer for a ProSe Function (e.g., ProSe Function 704A in VPLMN or Local PLMN) to perform charging. The validity timer may indicate a length of time the ProSe Application Code may be valid. In some embodiments, the ProSe Function 704B in the HPLMN may consider the Requested Timer parameter (e.g., provided by the UE 702) when allocating the validity timer. In certain embodiments, if the ProSe Function 704A may receive the same Discovery Entry ID in a subsequent announce authorization message, the ProSe Function 704A may update the announcing UE's corresponding discovery entry by replacing an existing ProSe application code and/or validity timer with a newly received ProSe application code and/or validity timer.

In some embodiments, if dynamic metadata is used, the ProSe Function may store the metadata with the associated ProSe Application ID in the UE context and allocate a corresponding Metadata Index to be included in the ProSe application code. If a command is set to "metadata_update," within a discovery request message (e.g., Discovery Request 708), for example, a ProSe Function (e.g., ProSe Function 704B) may update the Metadata Index portion of the ProSe application code. In certain embodiments, the ProSe Function 704B may only update the Metadata Index portion of the ProSe application code, keeping the remainder of the ProSe application code unchanged. In some embodiments, the announce authorization message (e.g., Announced Auth 716) may also include the metadata. If application-controlled extension is used, in some instances, a ProSe Function (e.g., ProSe Function 704B in the HPLMN) may allocate a ProSe Application Code Prefix (e.g., rather than a ProSe Application Code) based on the Application ID.

In some embodiments, a ProSe Function (e.g., ProSe Function 704A in VPLMN or Local PLMN) authorizes the UE to perform ProSe Direct Discovery announcing. In certain embodiments, a ProSe Function (e.g., ProSe Function 704B in HPLMN) may transmit an announce authorization message (e.g., Announce Auth) and receive an announced authorization acknowledgment (e.g., Announce Auth Ack 718) only when a requested PC5 radio technology is E-UTRA.

In some embodiments, a ProSe Function (e.g., ProSe Function 704B in HPLMN) shall respond to a UE with a discovery response message (e.g., Discovery Resp 720), The discovery response message 720, in some embodiments, may include one or more parameters, for example, any one or more of a ProSe Application Code, validity timer, Discovery Entry ID, and/or PC5_tech. In some embodiments, the ProSe Function 704B (e.g., in HPLMN) may provide ProSe application code corresponding to the ProSe Application ID included in the discovery request message 708 from the UE 702. The validity timer may indicate a duration of time for which the ProSe application code may be valid. The UE 702 may be authorized to announce the ProSe application code, in certain embodiments, for the duration of validity timer (e.g., if it remains in the same PLMN).

in some embodiments, a PC5_tech parameter may be optional and may indicate a PC5 radio technology to be used for an assigned ProSe application code. In certain embodiments, when a PC5_tech parameter is omitted the intended PC5 radio technology may be E-UTRA. If application-controlled extension is used, in some embodiments, the ProSe application code may be replaced by a ProSe Application Code Prefix, and the discovery response message 720 may also contains the ProSe Application Code Suffix pool. In some embodiments, to avoid interrupting a discovery procedure, if a UE (e.g., 702) changes its PLMN, but the validity timer of the Prose Application Code has not yet expired, the ProSe Function may allocate the same ProSe application code to the UE 702, with a validity timer set to the residual validity time of the validity timer not yet expired. In some embodiments, the UE 702 may append a ProSe Application Code Suffix from the ProSe Application Code Suffix pool to the ProSe Application Code Prefix to form a ProSe application code.

For example, if the ProSe Application Code Suffix pool contains multiple suffixes, the UE 702 may use two or more different suffixes from the ProSe Application Code Suffix pool to form different ProSe application codes to announce. In such cases, for example, the UE may form different ProSe application codes to announce without having to contact a ProSe Function (e.g., as long as the ProSe Application Code Prefix is valid). In some embodiments, a UE (e.g., 702) may start announcing ProSe application code (e.g., ProSe application code received in a discovery response message). For example, the UE 702 may start announcing ProSe application code in the VPLMN and/or the Local PLMN. In some embodiments, the UE (e.g., 702) may start announcing ProSe application code using the radio resources authorized and configured by E-UTRAN to be used for ProSe Direct Discovery as defined in RAN specifications or using WLAN.

Figure 8:
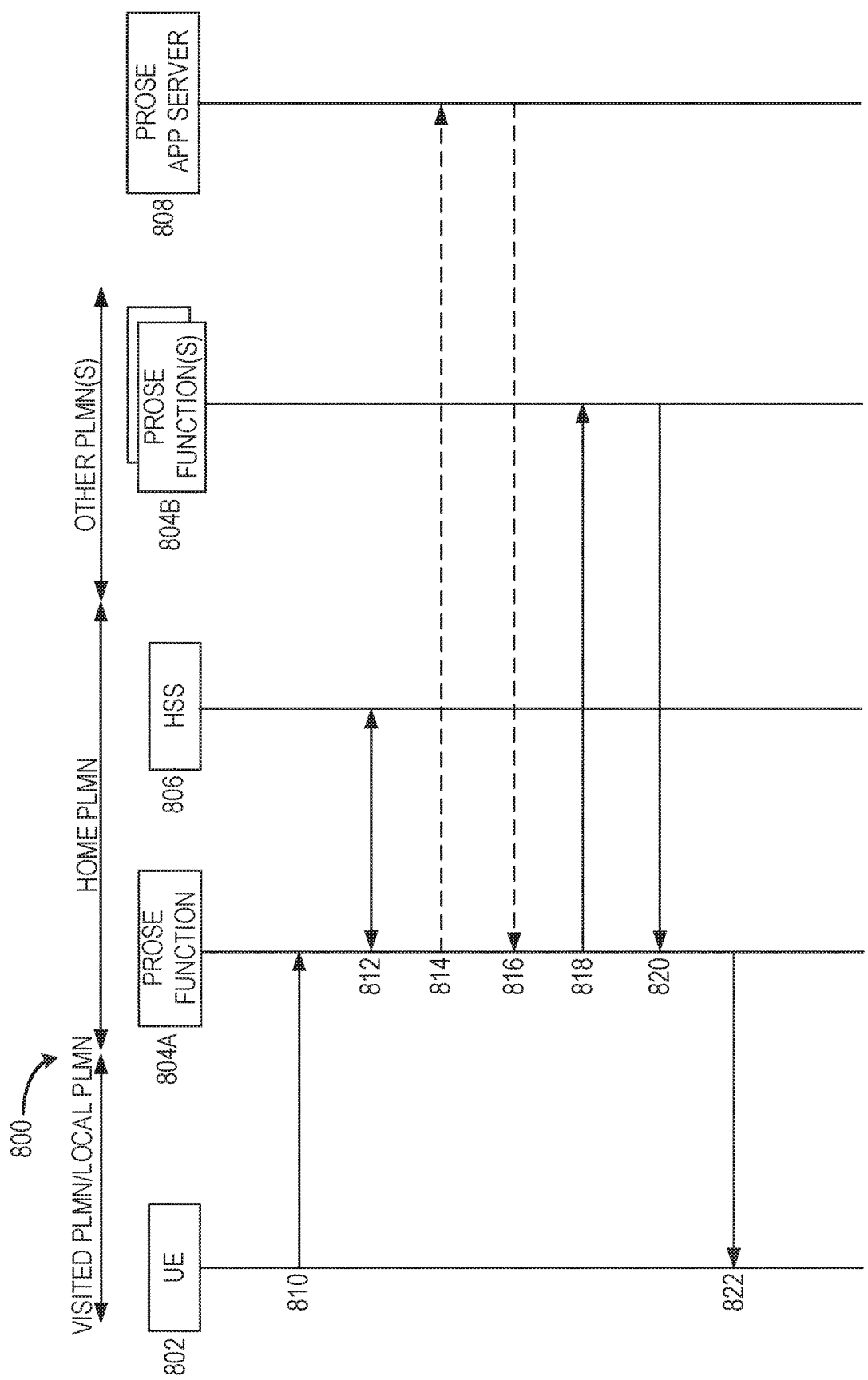
FIG. 8 illustrates a flow of a monitor request procedure in accordance with some embodiments.

FIG. 8 illustrates a flow of a monitor request procedure 800, in accordance with some embodiments. In some embodiments, FIG. 8 illustrates a flow between a UE 802 (e.g., configured for monitoring direct discovery messages) and one or more network elements of a 3GPP system architecture for ProSe Direct discovery. In certain embodiments, a UE may also be UE 802, with respect to FIG. 8, and may also be configured for announcing direct discovery messages. Network elements may include, in some embodiments, one or multiple ProSe Functions (e.g., 804A, 804B), one or multiple ProSe servers (e.g., 808) and a Home Subscriber Server (HSS) (e.g., 806). In some embodiments, the UE 802 maybe operating within a VPLMN and/or a LPLMN and may transmit a request message to announce (e.g., advertise) for direct discovery.

In some embodiments, FIG. 8 illustrates a call flow describing a procedure for a Discovery Request and the Discovery Request procedure may include roaming, for example, wherein a ProSe Function in HPLMN may communicate with one or more ProSe Functions in PLMNs separate from the HPLMN. In certain embodiments, a procedure for a Discovery Request (e.g., Discovery Request message 810) may include a new parameter, for example, PC5_tech parameter. The PC5_tech parameter, in some embodiments, may also be present in other procedures including a monitor request message (e.g., Monitor Request message 818), a monitor response message (e.g., Monitor Response message 820), and/or a discovery response message (e.g., Discovery Response message 822).

In some embodiments, if a UE (e.g., 802) is authorized to monitor in at least one PLMN (e.g., and is to monitor certain ProSe Application ID(s)), the UE 802 may establish a secure connection with a ProSe Function (e.g., ProSe Function 804A in the HPLMN) and may transmit a discovery request message 810 for monitoring. In certain embodiments, where the UE 802 is authorized to monitor in at least one PLMN, and the UE 802 intends to use a certain PC5 radio technology for monitoring, the UE may establish a secure connection with the ProSe Function 804A and may transmit a discovery request message (e.g., 810). The discovery request message 810 (e.g., for monitoring) may include, in certain embodiments, one or more parameters ProSe Application ID(s), UE Identity, monitor command. Application ID, Discovery Entry ID, Requested Timer, and/or the PC5 technology (e.g., PC5_tech) parameter.

In some embodiments, the ProSe Application ID(s) may indicate what a UE 802 is to perform monitoring and may consist of a subset of the data structure of the PLMN. The UE Identity may be set to IMSI, in some instances. The Application ID may represent a unique identifier of the application that has triggered the transmission of the discovery request message 810. The Discovery Entry ID may indicate whether a request is a new request. The Requested Timer is may be an optional parameter, in some instances. In some embodiments, PC5_tech may be an optional parameter to indicate the PC5 radio technology (e.g. cellular-based and/or WLAN-based, E-UTRA, NAN, Wi-Fi P2P) that the UE 802 is to use for monitoring. In certain embodiments, PC5_tech may include more than one PC5 radio technology. In some instances, the PC5_tech parameter may be omitted and such instances the intended PC5 radio technology may be E-UTRA. A discovery request message 810, in some embodiments, may always be sent to the ProSe Function in HPLMN. If application-controlled extension is used, in certain embodiments, the Application Level Container may be included, containing information corresponding to the ProSe Application Code Suffix.

In some embodiments, the ProSe Function (e.g., 804A) may verify authorization of the application represented by the Application ID, and if the ProSe Function 804A does not find an associated UE context, the ProSe Function 804A may verify authorization for discovery with HSS (e.g., 806) and create a new context for the UE 802 that contains the subscription parameters for the UE. In certain instances, a discovery authorization message (e.g., Discovery Auth 812) may also contain one or more PLMN IDs (e.g., for the UE 802 to perform discovery). The HSS 806 may also provide the VPLMN ID where the UE 802 is registered. In some embodiments, HSS 806 may provide the MSISDN of the UE 802. When the Discovery Entry ID in the discovery request message 810 does not contain a valid value for a UE 802, the ProSe Function 804A may create a new discovery entry in the UE's context (e.g., for a discovery request message 810) and may return the corresponding identifier in a discovery response message 822 (described further below).

In some embodiments, the UE 802 may indicate application-controlled extension by including the Application Level Container. In such embodiments, the ProSe Function 804A may transmit an authorization request message (e.g., transmit Auth Request 814) to the ProSe Application Server (e.g., 808), for example, as indicated by an Application ID. In certain embodiments, the authorization request message 814 may include one or more parameters, for example, any one or more of ProSe Application ID, Request Type, and/or Application Level Container. The Request Type, in some instances, may be set to "open discovery with application controlled extension/monitor," although embodiments are not so limited.

The ProSe Application Server 808, in some embodiments, may return an authorization response message (e.g., Auth Response 816). In certain embodiments, the authorization response message may include one or more parameters, for example, any one or more of Response Type, Mask(s) for the ProSe Application Code Suffixes) (e.g., corresponding to ProSe Application ID). The Response Type, in some instances, may be set to "open discovery with application-controlled extension/monitor ack," although embodiments are so limited.

In some embodiments, if a discovery request (e.g., Discovery Request 810) is authorized (e.g., by ProSe Application Server 808), and the ProSe Application ID sent by the UE 802 (e.g., in the discovery request message 810) indicates a PLMN other than the HPLMN, the processes including a monitor request message transmission (e.g., 818), a monitor response message transmission (e.g., 820), a discovery response message transmission (e.g., 822), and radio resource allocation may be performed (e.g., by one or more ProSe Functions 804A, 804B, and a UE 502, 802). In other embodiments, if the ProSe Application ID sent by the UE 802 (e.g., in the discovery request message) indicates the HPLMN, the processes including the Discovery Response (e.g., transmission of a discovery response message 822) and radio resource allocation may be performed (e.g., by one or more ProSe Functions and a UE).

In some embodiments, when the ProSe Application ID has a PLMN-specific scope, the ProSe Function 804A (e.g., ProSe Function in HPLMN) may contact one or more other ProSe Functions (e.g., 804B) in one or more other PLMNs indicated by the ProSe Application ID(s) transmitted by the UE. For example, the ProSe Function 804A in HPLMN may contact one or more other PLMNs to resolve a corresponding ProSe Application ID name to ProSe Application Code(s) and/or a ProSe Application Mask. A request message (e.g., monitor request message 818), in some instances, may include the UE identity information (e.g., IMSI or MSISDN) to allow the ProSe Function in a LPLMN and/or VPLMN to perform one or more processes (e.g., process the Discovery. Entry ID and/or perform charging).

In some embodiments, if the ProSe Function in another PLMN (e.g., 804B) receives the same Discovery Entry ID (e.g., in a subsequent monitor request message), the PLMN (e.g., ProSe Function in PLMN) may update a corresponding Discovery Entry ID, of a monitoring UE, with the received corresponding parameters. In certain embodiments, a request message (e.g., monitor request message 818) may include a PC5_tech parameter, for example, if the PC5_tech parameter was provided by the UE in the Discovery Request message. If the PC5_tech parameter is omitted, in some instances, the intended PC5 radio technology may be designated as E-UTRA.

In some embodiments, if the ProSe Function of one or more other PLMN(s) stores valid ProSe application code corresponding to the requested ProSe Application ID Name(s) (e.g., requested by the ProSe Function in HPLMN) and corresponding to the requested PC5 radio technology (e.g., indicated in a monitor request message), the ProSe Function of the one or more other PLMN(s) (e.g., a ProSe Function of VPLMN and or LPLMN) may return certain parameters. For example, parameters including any one or more of related ProSe Application Code(s), ProSe Application Mask(s), and a corresponding TTL parameter. A TTL parameter may indicate a length of time that another parameter, such as a related Discovery Filter, is valid for after it is received. Based on the UE context in the ProSe Function (e.g., ProSe Function of VPLMN and/or LPLMN), in certain embodiments, the ProSe application code may also include a PLMN ID of the PLMN in which the UE is registered, if the UE is announcing, for the ProSe Function in HPLMN of the monitoring UE to store in the associated UE context.

In some embodiments, a monitor response message 820 may include an optional PC5_tech parameter to indicate a PC5 radio technology that may be used for the assigned. ProSe Application Code. If this parameter (e.g., PC5_tech parameter) is omitted, in some instances, the intended PC5 radio technology may be designated as E-UTRA. In some embodiments, if application-controlled extension is used, the ProSe Application Code may be replaced by the ProSe Application Code Prefix.

in some embodiments, the ProSe Function (e.g., ProSe Function 804A in the HPLMN) may respond with a discovery response message (e.g., Discovery Response 822). The discovery response message, in certain embodiments, may include one or more parameters, for example, one or more of Discovery Filters, Discovery Entry IDs, one or more corresponding TTL parameters, and/or a PC5_tech parameter. The TTL parameters corresponding to the Discovery Filter parameter(s) (e.g., in the Discovery Filter), in some instances, may indicate a duration of time that one or more Discovery Filter may be valid. In certain embodiments, an optional parameter (e.g., PC5_tech parameter) may indicate the PC5 radio technology to be used for the assigned ProSe application code. If this parameter is omitted, in certain instances, the intended PC5 radio technology may be designated as E-UTRA. In some embodiments, if application-controlled extension is used, the ProSe application code in the Discovery Filter may be replaced by the ProSe Application Code Prefix.

In certain embodiments, a Discovery Filter may include any one or more of a ProSe application code, one or more ProSe application masks, and/or one or more TTL parameters (e.g., corresponding to ProSe application code and/or one or more ProSe application masks). In restricted ProSe Direct Discovery, a Discovery Filter may consist of a ProSe Restricted Code, ProSe Application Masks(s) and a TTL, A TTL may indicate a duration of time that the related Discovery Filter is valid for after it is received. In some embodiments, a monitoring UE (e.g., 802) may use the Discovery Filter to selectively match ProSe application codes or ProSe Restricted Codes received on the PC5 interface (e.g., from an announcing UE 502). For example, a monitoring UE may match ProSe application codes or ProSe Restricted Codes received on a PC5 interface (e.g., from an announcing UE) using a PC5 radio technology to ProSe application codes or ProSe restricted codes that a ProSe Function (e.g., ProSe Function 804A in HPLMN) has provided, according to a specified PC5 radio technology (e.g., a PC5 radio technology specified by the PC5_tech parameter within a discovery response message).

In addition to the ProSe application code, in certain embodiments, the Discovery Filter may contain one or more masks for a ProSe Application Code Suffix, which may be obtained from the ProSe Application Server (e.g., in an authorization response). The UE may add additional mask(s) and values for the ProSe Application Code Suffix. In some embodiments, the UE may be configured to randomize a request for assignment of new Discovery Filter, for example, to guard against a peak of Discovery Requests when the TTL expires.

To allow a change of the announced ProSe Application Code(s) without interrupting a discovery procedure, in certain embodiments, a discovery response message (e.g., Discovery Response message 822 from a ProSe Function 804A)

may include multiple Discovery Filters (e.g., two Discovery Filters) for the same ProSe Application ID. For example, a monitoring UE may have one or more Discovery Filters for both the ProSe application code currently in use by an announcing UE (e.g., 502) and a replacement ProSe application code. In other embodiments, a ProSe Application Mask may be used to match one or more ProSe application codes (e.g., to match a PC5 radio technology for announcing to a PC5 radio technology to monitoring). In certain embodiments, a monitor request message may specify the behavior of one or more ProSe Functions (e.g., in HPLMN, LPLMN, VPLMN) when a valid ProSe application code is not available for a requested ProSe Application ID.

In some embodiments, during a Radio Resource Allocation procedure, a UE may start monitoring using one or more Discovery Filters in radio resources, wherein one or more PLMNs may authorize and configure the radio resources to be used for ProSe, as defined in certain radio access network (RAN) specifications.

Figure 9:
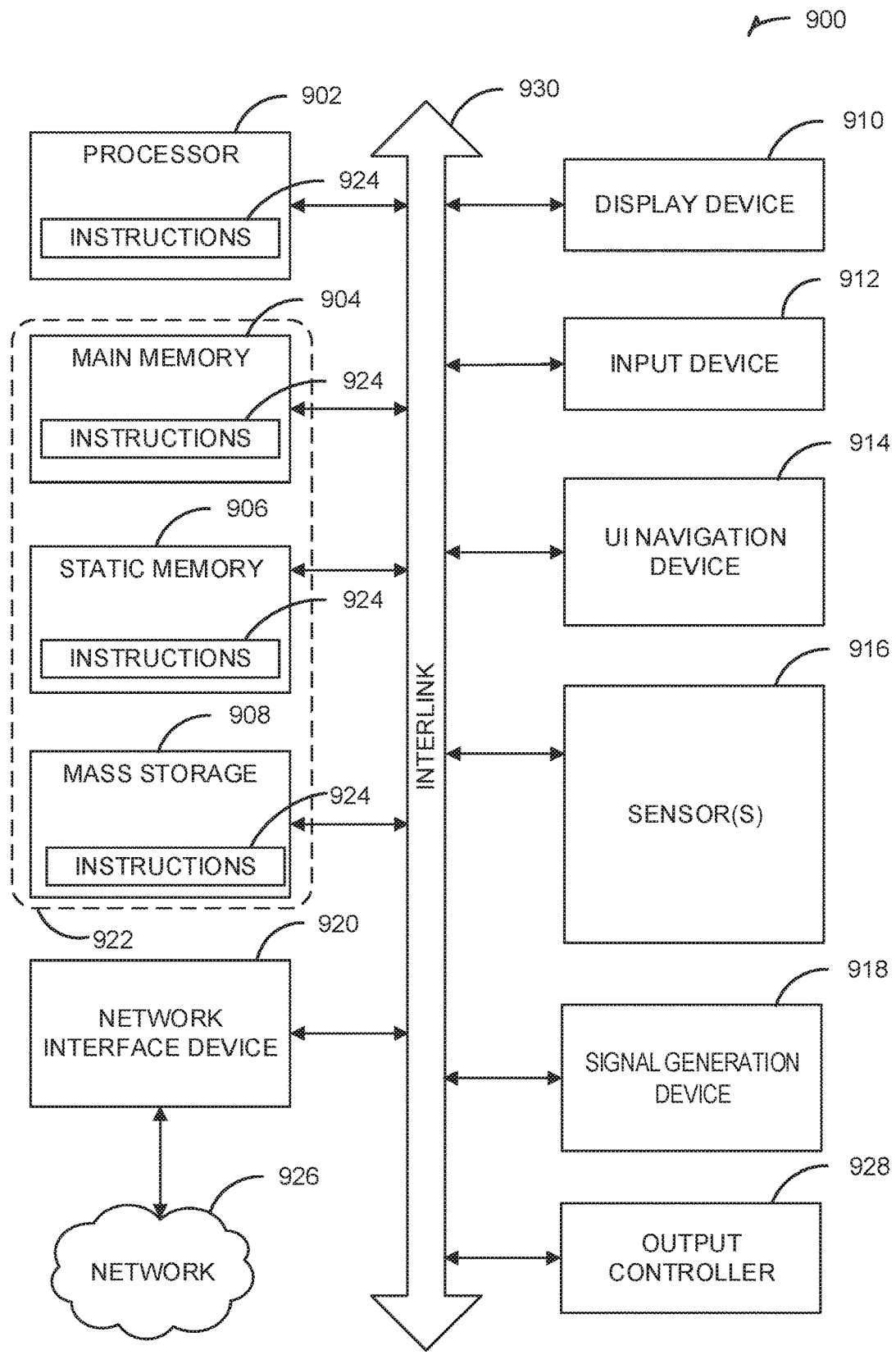
FIG. 9 illustrates a block diagram of an example machine, in accordance with some embodiments.

FIG. 9 illustrates a block diagram of an example machine 900 upon which any one or more of the techniques (e.g., methodologies) discussed herein may be performed, for example, one or more ProSe Direct Discovery processes. Examples, as described herein, may include, or may operate by, logic or a number of components, or mechanisms in the machine 900. Circuitry (e.g., processing circuitry) is a collection of circuits implemented in tangible entities of the machine 900 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 900 follow.

In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 900 may include a hardware processor 902 (e.g., a central processing unit (CPU), a graphics processing unit (GPU), a hardware processor core, or any combination thereof), a main memory 904, a static memory (e.g., memory or storage for firmware, microcode, a basic-input-output (BIOS), unified extensible firmware interface (UEFI), etc.) 906, and mass storage 908 (e.g., hard drive, tape drive, flash storage, or other block devices) some or all of which may communicate with each other via an interlink (e.g., bus) 930. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 908, a signal generation device 918 (e.g., a speaker), a network interface device 920, and one or more sensors 916, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 902, the main memory 904, the static memory 906, or the mass storage 908 may be, or include, a machine readable medium 922 on which is stored one or more sets of data structures or instructions 924 (e.g., software) embodying or utilized by any one or more of the techniques or functions described herein. The instructions 924 may also reside, completely or at least partially, within any of registers of the processor 902, the main memory 904, the static memory 906, or the mass storage 908 during execution thereof by the machine 900, in an example, one or any combination of the hardware processor 902, the main memory 904, the static memory 906, or the mass storage 908 may constitute the machine readable media 922, While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may be further transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as Wi-Max®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software. A transmission medium is a machine readable medium.

EXAMPLES

Although an aspect has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a User Equipment (UE), configured as a Proximity Services (ProSe) enabled UE, the apparatus comprising: processing circuitry to configure the UE to perform a ProSe Direct Discovery process, wherein as part of the ProSe Direct Discovery process, the processing circuitry is configured to: encode, for transmission over a PC3 interface to a ProSe Function in a Home Public Land Mobile Network (HPLMN), a discovery request message for an announcing procedure, the announcing procedure including transmission of one or more announcements over a PC5 interface, wherein the discovery request message for the announcing procedure includes, a PC5 technology (PC5_tech) parameter to indicate a PC5 radio technology to be used by the UE for the announcing procedure, and wherein the processing circuitry configures the UE to use a WLAN PC5 radio technology for the announcing procedure; and decode a discovery response message for the announcing procedure, the discovery response message for the announcing procedure received over the PC3 interface from the ProSe Function in the HPLMN, wherein the discovery response message for the announcing procedure includes a ProSe application code and the PC5_tech parameter to indicate the PC5 radio technology authorized to be used for the ProSe application code; and memory configured to store the ProSe application code.

In Example 2, the subject matter of Example 1 includes, wherein the processing circuitry is further configured to encode the discovery request message for the announcing procedure without the PC5_tech parameter when the PC5 radio technology is E-UTRA.

In Example 3, the subject matter of Examples 1-2 includes, wherein the ProSe application code corresponds to a ProSe application ID parameter contained in the discovery request message for the announcing procedure.

In Example 4, the subject matter of Examples 1-3 includes, wherein as part of the ProSe Direct Discovery process, the processing circuitry is configured to: encode, for transmission over the PC3 interface to the ProSe Function in the HPLMN, a discovery request message for a monitoring procedure, the monitoring procedure including reception of one or more announcements over the PC5 interface, wherein the discovery request message for the monitoring procedure includes the PC5_tech parameter to indicate a PC5 radio technology to be used by the UE for the monitoring procedure, and wherein the processing circuitry configures the UE to use a WLAN PC5 radio technology for the monitoring procedure; and decode a discovery response message for the monitoring procedure, the discovery response message for the monitoring procedure received over the PC3 interface from the ProSe Function in the HPLMN, wherein the discovery response message for the monitoring procedure includes a discovery filter parameter, and the PC5_tech parameter to indicate the PC5 radio technology to be used for the discovery filter parameter.

In Example 5, the subject matter of Example 4 includes, wherein the processing circuitry is configured to use the discovery filter parameter to match one or more additional ProSe application codes received over the PC5 interface.

In Example 6, the subject matter of Examples 4-5 includes, wherein the discovery filter parameter includes the ProSe application code, a ProSe application mask parameter, and a time to live (TTL) parameter, wherein the TTL parameter indicates a length of time for which the discovery filter parameter is valid.

In Example 7, the subject matter of Examples 4-6 includes, wherein the processing circuitry is configured to include a ProSe application parameter in the discovery request message for the monitoring procedure.

Example 8 is an apparatus of a network element, configured as a Proximity Services (ProSe) Function, in a Public Land Mobile Network (PLMN), the apparatus comprising: processing circuitry to configure the network element to perform a ProSe Direct Discovery process, wherein as part of the ProSe Direct Discovery process, the processing circuitry is configured to: decode a discovery request message for an announcing procedure, the discovery request message for the announcing procedure received over a PC3 interface from a User Equipment (UE) configured as a Proximity Services (ProSe) enabled UE, the announcing procedure including transmission of one or more announcements over a PC5 interface, wherein the discovery request message for the announcing procedure includes, a PC5 technology (PC5_tech) parameter to indicate a PC5 radio technology to be used by the UE for the announcing procedure, and wherein the UE is configured to use a WLAN PC5 radio technology for the announcing procedure; and encode, for transmission to the UE over the PC3 interface, a discovery response message for the announcing procedure, wherein the discovery response message for the announcing procedure includes a ProSe application code and the PC5_tech parameter to indicate the PC5 radio technology authorized to be used for the ProSe application code; and memory configured to store the ProSe application code.

In Example 9, the subject matter of Example 8 includes, wherein as part of the ProSe Direct Discovery process, the processing circuitry is configured to: decode a discovery request message for a monitoring procedure, the discovery request message for the monitoring procedure received over a PC3 interface from the UE, the monitoring procedure including reception of one or more announcements over the PC5 interface, wherein the discovery request message for the monitoring procedure includes the PC5_tech parameter to indicate a PC5 radio technology to be used by the UE for the monitoring procedure, and wherein the UE is configured to use a WLAN PC5 radio technology for the monitoring procedure; and encode, for transmission to the UE over the PC3 interface, a discovery response message for the monitoring procedure, wherein the discovery response message for the monitoring procedure includes a discovery filter parameter for matching one or more additional ProSe application codes received over the PC5 interface, and the PC5_tech parameter to indicate the PC5 radio technology to be used for the discovery filter parameter.

In Example 10, the subject matter of Example 9 includes, wherein the PLMN is a Home PLMN (HPLMN), and wherein as part of the ProSe Direct Discovery process, the processing circuitry is configured to, in response to the discovery request message for the monitoring procedure including a ProSe application ID parameter that indicates a PLMN other than a Home PLMN: encode a monitor request message for transmission over a PC6 interface to a second ProSe Function, in a PLMN other than the HPLMN, wherein the monitor request message includes a ProSe application ID name parameter and the PC5_tech parameter indicating the PC5 radio technology to be used by the UE for the monitoring procedure; and decode a monitor response message, from the second ProSe Function over the PC6 interface, wherein the monitor response message includes any one or more of: an additional ProSe application code, a ProSe Application Mask, a time to live (TTL) parameter corresponding to any one of the additional ProSe Application code and the ProSe Application Mask, and the PC5_tech parameter to indicate the PC5 radio technology authorized to be used for the additional ProSe application code.

In Example 11, the subject matter of Example 10 includes, wherein as part of the ProSe Direct Discovery process, the processing circuitry is configured to include, within the discovery filter parameter, any one or more of the additional ProSe application code and the ProSe Application Mask, received from the second ProSe Function in the monitor response message, and a TTL parameter to indicate a length of time for which the discovery filter parameter is valid.

In Example 12, the subject matter of Example 11 includes, wherein as part of the ProSe Direct Discovery process, the processing circuitry is configured to encode the monitor request message for transmission over a PC7 interface and receive the monitor response message over the PC7 interface.

Example 13 is a computer-readable hardware storage device that stores instructions for execution by one or more processors of a User Equipment (UE), configured as a Proximity Services (ProSe) enabled UE, the instructions to configure the one or more processors to: encode, for transmission over a PC3 interface to a ProSe Function in a Home Public Land Mobile Network (HPLMN), a discovery request message for an announcing procedure, the announcing procedure including transmission of one or more announcements over a PC5 interface, wherein the discovery request message for the announcing procedure includes, a PC5 technology (PC5_tech) parameter to indicate a PC5 radio technology to be used by the UE for the announcing procedure, and configure the UE to use a WLAN PC5 radio technology for the announcing procedure; and configure transceiver circuitry to receive a discovery response message for the announcing procedure, the discovery response message for the announcing procedure received over the PC3 interface from the ProSe Function in the HPLMN, wherein the discovery response message for the announcing procedure includes a ProSe application code and the PC5_tech parameter to indicate the PC5 radio technology authorized to be used for the ProSe application code.

In Example 14, the subject matter of Example 13 includes, wherein the instructions are to configure the one or more processors to encode the discovery request message for the announcing procedure without the PC5_tech parameter when the PC5 radio technology is E-UTRA.

In Example 15, the subject matter of Examples 13-14 includes, wherein the ProSe application code corresponds to a ProSe application ID parameter contained in the discovery request message for the announcing procedure.

In Example 16, the subject matter of Examples 13-15 includes, wherein the instructions are to configure the one or more processors to: encode, for transmission over the PC3 interface to the ProSe Function in the HPLMN, a discovery request message for a monitoring procedure, the monitoring procedure including reception of one or more announcements over the PC5 interface, wherein the discovery request message for the monitoring procedure includes the PC5_tech parameter to indicate a PC5 radio technology to be used by the UE for the monitoring procedure, and configure the UE to use a WLAN PC5 radio technology for the monitoring procedure; and decode a discovery response message for the monitoring procedure, the discovery response message for the monitoring procedure received over the PC3 interface from the ProSe Function in the HPLMN, wherein the discovery response message for the monitoring procedure includes a discovery filter parameter, and the PC5_tech parameter to indicate the PC5 radio technology to be used for the discovery filter parameter.

Example 17 is a computer-readable hardware storage device that stores instructions for execution by one or more processors of a network element, configured as a Proximity Services (ProSe) Function, in a Public Land Mobile Network (PLMN), the instructions to configure the one or more processors to: configure transceiver circuitry to receive a discovery request message for an announcing procedure, the discovery request message for the announcing procedure received over a PC3 interface from a User Equipment (UE) configured as a Proximity Services (ProSe) enabled UE, the announcing procedure including transmission of one or more announcements over a PC5 interface, wherein the discovery request message for the announcing procedure includes, a PC5 technology (PC5_tech) parameter to indicate a PC5 radio technology to be used by the UE for the announcing procedure, and wherein the UE is configured to use a WLAN PC5 radio technology for the announcing procedure; and encode, for transmission to the UE over the PC3 interface, a discovery response message for the announcing procedure, wherein the discovery response message for the announcing procedure includes a ProSe application code and the PC5_tech parameter to indicate the PC5 radio technology authorized to be used for the ProSe application code.

In Example 18, the subject matter of Example 17 includes, wherein the instructions are to configure the one or more processors to: configure the transceiver circuitry to receive a discovery request message for a monitoring procedure, the discovery request message for the monitoring procedure received over a PC3 interface from the UE, the monitoring procedure including reception of one or more announcements over the PC5 interface, wherein the discovery request message for the monitoring procedure includes the PC5_tech parameter to indicate a PC5 radio technology to be used by the UE for the monitoring procedure, and wherein the UE is configured to use a WLAN PC5 radio technology for the monitoring procedure; and encode, for transmission to the UE over the PC3 interface, a discovery response message for the monitoring procedure, wherein the discovery response message for the monitoring procedure includes a discovery filter parameter for matching one or more additional ProSe application codes received over the PC5 interface, and the PC5_tech parameter to indicate the PC5 radio technology to be used for the discovery filter parameter.

In Example 19, the subject matter of Example 18 includes, wherein the PLMN is a Home PLMN (HPLMN), and wherein the instructions are to configure the one or more processors to, in response to the discovery request message for the monitoring procedure including a ProSe application ID parameter that indicates a PLMN other than a Home PLMN: encode a monitor request message for transmission over a PC6 interface to a second ProSe Function, in a PLMN other than the HPLMN, wherein the monitor request message includes a ProSe application ID name parameter and the PC5_tech parameter indicating the PC5 radio technology to be used by the UE for the monitoring procedure; and configure the transceiver circuitry to receive a monitor response message, from the second ProSe Function over the PC6 interface, wherein the monitor response message includes any one or more of: an additional ProSe application code, a ProSe Application Mask, a time to live (TTL) parameter corresponding to any one of the additional ProSe Application code and the ProSe Application Mask, and the PC5_tech parameter to indicate the PC5 radio technology authorized to be used for the additional ProSe application code.

In Example 20, the subject matter of Example 19 includes, wherein the instructions are to configure the one or more processors to include, within the discovery filter parameter, any one or more of the additional ProSe application code and the ProSe Application Mask, received from the second ProSe Function in the monitor response message, and a TTL parameter to indicate a length of time for which the discovery filter parameter is valid.

Example 21 is an apparatus of a User Equipment (UE), configured as a Proximity Services (ProSe) enabled UE, the apparatus comprising: means to encode, for transmission over a PC3 interface to a ProSe Function in a Home Public Land Mobile Network (HPLMN), a discovery request message for an announcing procedure, the announcing procedure including transmission of one or more announcements over a PC5 interface, wherein the discovery request message for the announcing procedure includes, a PC5 technology (PC5_tech) parameter to indicate a PC5 radio technology to be used by the UE for the announcing procedure, and means to configure the to use a WLAN PC5 radio technology for the announcing procedure; means to decode a discovery response message for the announcing procedure, the discovery response message for the announcing procedure received over the PC3 interface from the ProSe Function in the HPLMN, wherein the discovery response message for the announcing procedure includes a ProSe application code and the PC5_tech parameter to indicate the PC5 radio technology authorized to be used for the ProSe application code; and means to store the ProSe application code.

In Example 22, the subject matter of Example 21 includes, further comprising means to encode the discovery request message for the announcing procedure without the PC5_tech parameter when the PC5 radio technology is E-UTRA.

In Example 23, the subject matter of Examples 21-22 includes, wherein the ProSe application code corresponds to a ProSe application ID parameter contained in the discovery request message for the announcing procedure.

In Example 24, the subject matter of Examples 21-23 includes, means to encode, for transmission over the PC3 interface to the ProSe Function in the HPLMN, a discovery request message for a monitoring procedure, the monitoring procedure including reception of one or more announcements over the PC5 interface, wherein the discovery request message for the monitoring procedure includes the PC5_tech parameter to indicate a PC5 radio technology to be used by the UE for the monitoring procedure, and means to configure the UE to use a WLAN PC5 radio technology for the monitoring procedure; and means to decode a discovery response message for the monitoring procedure, the discovery response message for the monitoring procedure received over the PC3 interface from the ProSe Function in the HPLMN, wherein the discovery response message for the monitoring procedure includes a discovery filter parameter, and the PC5_tech parameter to indicate the PC5 radio technology to be used for the discovery filter parameter.

In Example 25, the subject matter of Example 24 includes, means to use the discovery filter parameter to match one or more additional ProSe application codes received over the PC5 interface.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

What is claimed is:

1. An apparatus of a User Equipment (UE), configured as a Proximity Services (ProSe) enabled UE, the apparatus comprising:
  processing circuitry to configure the UE to perform a ProSe Direct Discovery process, wherein as part of the ProSe Direct Discovery process, the processing circuitry is configured to:
  encode, for transmission over a PC3 interface to a ProSe Function in a Home Public Land Mobile Network (HPLMN), a discovery request message for an announcing procedure, the announcing procedure including transmission of one or more announcements over a PC5 interface, wherein the discovery request message for the announcing procedure includes a PC5 technology (PC5_tech) parameter comprising a bitmap indicating whether only one, both or neither of two or more PC5 radio technologies are preferred to be used by the UE for the announcing procedure, wherein the two or more PC5 radio technologies include at least Evolved Universal Terrestrial Radio Access (E-UTRA) and wireless local area network (WLAN), wherein the bitmap comprises at least one bit indicating whether E-UTRA is preferred to be used by the UE for the announcing procedure and at least one bit indicating whether WLAN is preferred to be used by the UE for the announcing procedure; and
  decode a discovery response message for the announcing procedure, the discovery response message for the announcing procedure received over the PC3 interface from the ProSe Function in the HPLMN, wherein the discovery response message for the announcing procedure includes a ProSe application code and the PC5_tech parameter to indicate a PC5 radio technology authorized to be used for the ProSe application code; and
  memory configured to store the ProSe application code.

2. The apparatus of claim 1,
wherein the ProSe application code corresponds to a ProSe application identifier (ID) parameter contained in the discovery request message for the announcing procedure.

3. The apparatus of claim 1,
wherein as part of the ProSe Direct Discovery process, the processing circuitry is configured to:
  encode, for transmission over the PC3 interface to the ProSe Function in the HPLMN, a discovery request message for a monitoring procedure, the monitoring procedure including reception of one or more announcements over the PC5 interface, wherein the discovery request message for the monitoring procedure includes the PC5 tech parameter to indicate a PC5 radio technology to be used by the UE for the monitoring procedure, and wherein the processing circuitry configures the UE to use a WLAN PC5 radio technology for the monitoring procedure; and
  decode a discovery response message for the monitoring procedure, the discovery response message for the monitoring procedure received over the PC3 interface from the ProSe Function in the HPLMN, wherein the discovery response message for the monitoring procedure includes a discovery filter parameter, and the PC5_tech parameter to indicate a PC5 radio technology to be used for the discovery filter parameter.

4. The apparatus of claim 3,
wherein the processing circuitry is configured to use the discovery filter parameter to match one or more additional ProSe application codes received over the PC5 interface.

5. The apparatus of claim 3,
wherein the discovery filter parameter includes the ProSe application code, a ProSe application mask parameter, and a time to live (TTL) parameter, wherein the TTL parameter indicates a length of time for which the discovery filter parameter is valid.

6. The apparatus of claim 3,
wherein the processing circuitry is configured to include a ProSe application identifier (ID) parameter in the discovery request message for the monitoring procedure.

7. The apparatus of claim 1,
wherein as part of the ProSe Direct Discovery process, the processing circuitry is configured to receive a monitor request message over a PC7 interface and encode a monitor response message for transmission over the PC7 interface.

8. An apparatus of a network element, configured as a Proximity Services (ProSe) Function, in a Public Land Mobile Network (PLMN), the apparatus comprising:

processing circuitry to configure the network element to perform a ProSe Direct Discovery process, wherein as part of the ProSe Direct Discovery process, the processing circuitry is configured to:

decode a discovery request message for an announcing procedure, the discovery request message for the announcing procedure received over a PC3 interface from a User Equipment (UE) configured as a Proximity Services (ProSe) enabled UE, the announcing procedure including transmission of one or more announcements over a PC5 interface, wherein the discovery request message for the announcing procedure includes a PC5 technology (PC5_tech) parameter comprising a bitmap indicating whether each only one, both or neither of two or more PC5 radio technologies are preferred to be used by the UE for the announcing procedure, wherein the two or more PC5 radio technologies include at least Evolved Universal Terrestrial Radio Access (E-UTRA) and wireless local area network (WLAN), wherein the bitmap comprises at least one bit indicating whether E-UTRA is preferred to be used by the UE for the announcing procedure and at least one bit indicating whether WLAN is preferred to be used by the UE for the announcing procedure; and encode, for transmission to the UE over the PC3 interface, a discovery response message for the announcing procedure, wherein the discovery response message for the announcing procedure includes a ProSe application code and the PC5_tech parameter to indicate a PC5 radio technology authorized to be used for the ProSe application code; and memory configured to store the ProSe application code.

9. The apparatus of claim 8, wherein as part of the ProSe Direct Discovery process, the processing circuitry is configured to:

decode a discovery request message for a monitoring procedure, the discovery request message for the monitoring procedure received over a PC3 interface from the UE, the monitoring procedure including reception of one or more announcements over the PC5 interface, wherein the discovery request message for the monitoring procedure includes the PC5_tech parameter to indicate a PC5 radio technology to be used by the UE for the monitoring procedure, and wherein the UE is configured to use a WLAN PC5 radio technology for the monitoring procedure; and encode, for transmission to the UE over the PC3 interface, a discovery response message for the monitoring procedure, wherein the discovery response message for the monitoring procedure includes a discovery filter parameter for matching one or more additional ProSe application codes received over the PC5 interface, and the PC5_tech parameter to indicate a PC5 radio technology to be used for the discovery filter parameter.

10. The apparatus of claim 9, wherein the PLMN is a Home PLMN (HPLMN), and wherein as part of the ProSe Direct Discovery process, the processing circuitry is configured to, in response to the discovery request message for the monitoring procedure including a ProSe application identifier (ID) parameter that indicates a PLMN other than a Home PLMN:

encode a monitor request message for transmission over a PC6 interface to a second ProSe Function, in a PLMN other than the HPLMN, wherein the monitor request message includes a ProSe application ID name parameter and the PC5_tech parameter indicating the PC5 radio technology to be used by the UE for the monitoring procedure; and decode a monitor response message, from the second ProSe Function over the PC6 interface, wherein the monitor response message includes any one or more of:

an additional ProSe application code, a ProSe Application Mask, a time to live (TTL) parameter corresponding to any one of the additional ProSe Application code and the ProSe Application Mask, and the PC5_tech parameter to indicate a PC5 radio technology authorized to be used for the additional ProSe application code.

11. The apparatus of claim 10, wherein as part of the ProSe Direct Discovery process, the processing circuitry is configured to include, within the discovery filter parameter, any one or more of the additional ProSe application code and the ProSe Application Mask, received from the second ProSe Function in the monitor response message, and a TTL parameter to indicate a length of time for which the discovery filter parameter is valid.

12. The apparatus of claim 9, wherein as part of the ProSe Direct Discovery process, the processing circuitry is configured to encode a monitor request message for transmission over a PC7 interface and receive a monitor response message over the PC7 interface.

13. The apparatus of claim 8, wherein the ProSe application code corresponds to a ProSe application identifier (ID) parameter contained in the discovery request message for the announcing procedure.

14. A computer-readable hardware storage device that stores instructions for execution by one or more processors of a User Equipment (UE), configured as a Proximity Services (ProSe) enabled UE, the instructions to configure the one or more processors to:

encode, for transmission over a PC3 interface to a ProSe Function in a Home Public Land Mobile Network (HPLMN), a discovery request message for an announcing procedure, the announcing procedure including transmission of one or more announcements over a PC5 interface, wherein the discovery request message for the announcing procedure includes a PC5 technology (PC5_tech) parameter comprising a bitmap indicating whether each only one, both or neither of two or more PC5 radio technologies are preferred to be used by the UE for the announcing procedure, wherein the two or more PC5 radio technologies include at least Evolved Universal Terrestrial Radio Access (E-UTRA) and wireless local area network (WLAN), wherein the bitmap comprises at least one bit indicating whether E-UTRA is preferred to be used by the UE for the announcing procedure and at least one bit indicating whether WLAN is preferred to be used by the UE for the announcing procedure; and configure transceiver circuitry to receive a discovery response message for the announcing procedure, the discovery response message for the announcing procedure received over the PC3 interface from the ProSe Function in the HPLMN, wherein the discovery response message for the announcing procedure includes a ProSe application code and the PC5_tech parameter to indicate a PC5 radio technology authorized to be used for the ProSe application code.

15. The computer-readable hardware storage device of claim 14,
wherein the ProSe application code corresponds to a ProSe application identifier (ID) parameter contained in the discovery request message for the announcing procedure.

16. The computer-readable hardware storage device of claim 14, wherein the instructions are to configure the one or more processors to:
encode, for transmission over the PC3 interface to the ProSe Function in the HPLMN, a discovery request message for a monitoring procedure, the monitoring procedure including reception of one or more announcements over the PC5 interface, wherein the discovery request message for the monitoring procedure includes the PC5 tech parameter to indicate a PC5 radio technology to be used by the UE for the monitoring procedure, and configure the UE to use a WLAN PC5 radio technology for the monitoring procedure; and
decode a discovery response message for the monitoring procedure, the discovery response message for the monitoring procedure received over the PC3 interface from the ProSe Function in the HPLMN, wherein the discovery response message for the monitoring procedure includes a discovery filter parameter, and the PC5 tech parameter to indicate a PC5 radio technology to be used for the discovery filter parameter.

17. The computer-readable hardware storage device of claim 16, wherein the instructions are further to configure the one or more processors to use the discovery filter parameter to match one or more additional ProSe application codes received over the PC5 interface.

18. The computer-readable hardware storage device of claim 16,
wherein the discovery filter parameter includes the ProSe application code, a ProSe application mask parameter, and a time to live (TTL) parameter, wherein the TTL parameter indicates a length of time for which the discovery filter parameter is valid.

19. The computer-readable hardware storage device of claim 16,
wherein the instructions are to configure the one or more processors to include a ProSe application identifier (ID) parameter in the discovery request message for the monitoring procedure.

20. The computer-readable hardware storage device of claim 13,
wherein as part of a ProSe Direct Discovery process, the instructions are to configure the one or more processors to receive a monitor request message over a PC7 interface and encode a monitor response message for transmission over the PC7 interface.

* * * * *